US010152145B2

(12) United States Patent
Fleck et al.

(10) Patent No.: US 10,152,145 B2
(45) Date of Patent: Dec. 11, 2018

(54) SYSTEM AND METHOD FOR BIDIRECTIONAL COMMUNICATION BETWEEN STYLUS AND STYLUS SENSOR CONTROLLER

(71) Applicant: Wacom Co., Ltd., Saitama (JP)

(72) Inventors: David Charles Fleck, Vancouver, WA (US); Sadao Yamamoto, Saitama (JP)

(73) Assignee: Wacom Co., Ltd., Saitama (JP)

(*) Notice: Subject to any disclaimer, the term of this patent is extended or adjusted under 35 U.S.C. 154(b) by 0 days.

(21) Appl. No.: 15/727,182

(22) Filed: Oct. 6, 2017

(65) Prior Publication Data
US 2018/0032164 A1 Feb. 1, 2018

Related U.S. Application Data

(63) Continuation of application No. 15/069,848, filed on Mar. 14, 2016, now Pat. No. 9,785,262.
(Continued)

(51) Int. Cl.
*G06F 3/0354* (2013.01)
*G06F 3/038* (2013.01)
(Continued)

(52) U.S. Cl.
CPC ........ *G06F 3/03545* (2013.01); *G06F 3/0346* (2013.01); *G06F 3/0383* (2013.01);
(Continued)

(58) Field of Classification Search
CPC .. G06F 3/03545; G06F 3/0346; G06F 3/0383; G06F 3/0416; G06F 3/0414; G06F 3/044
See application file for complete search history.

(56) References Cited

U.S. PATENT DOCUMENTS 5,736,980 A 4/1998 Iguchi et al.
7,278,018 B2 10/2007 Lapstun et al.
(Continued)

FOREIGN PATENT DOCUMENTS

JP 2014-63249 A 4/2014
WO 2015/111159 A1 7/2015

OTHER PUBLICATIONS

International Search Report and Written Opinion, dated Aug. 25, 2016, for International Application No. PCT/US2016/027316, 13 pages.
(Continued)

*Primary Examiner* — Liliana Cerullo
(74) *Attorney, Agent, or Firm* — Seed IP Law Group LLP

(57) ABSTRACT

A method is provided to interface an active stylus with a sensor controller, wherein the sensor controller is coupled to a sensor configured to receive input from the active stylus. In the method the sensor controller defines data frames consisting of more than one time slot usable for receiving packets from the stylus. The active stylus transmits, in response to a request from the sensor controller, a signal including stylus capability information. The sensor controller determines, based on the stylus capability information, a downlink time slot allocation for use by the active stylus to transmit packets to the sensor controller. The sensor controller transmits the downlink time slot allocation to the active stylus.

18 Claims, 19 Drawing Sheets

Related U.S. Application Data

(60) Provisional application No. 62/149,907, filed on Apr. 20, 2015, provisional application No. 62/162,527, filed on May 15, 2015, provisional application No. 62/243,427, filed on Oct. 19, 2015, provisional application No. 62/291,373, filed on Feb. 4, 2016.

(51) Int. Cl.
  *G06F 3/044* (2006.01)
  *G06F 3/0346* (2013.01)
  *G06F 3/041* (2006.01)

(52) U.S. Cl.
  CPC ............ *G06F 3/044* (2013.01); *G06F 3/0414* (2013.01); *G06F 3/0416* (2013.01)

(56) References Cited

U.S. PATENT DOCUMENTS

| | | |
|---|---|---|
| 2006/0010368 A1 | 1/2006 | Kashi |
| 2006/0109252 A1 | 5/2006 | Kolmykov-Zotov et al. |
| 2008/0143691 A1 | 6/2008 | Cook |
| 2008/0158165 A1 | 7/2008 | Geaghan et al. |
| 2008/0169132 A1 | 7/2008 | Ding et al. |
| 2009/0139780 A1 | 6/2009 | Katsurahira et al. |
| 2010/0155153 A1* | 6/2010 | Zachut ................ G06F 3/03545 178/18.03 |
| 2010/0315384 A1 | 12/2010 | Hargreaves et al. |
| 2011/0193776 A1 | 8/2011 | Oda et al. |
| 2012/0206349 A1 | 8/2012 | Nowatzyk et al. |
| 2012/0237140 A1 | 9/2012 | Lapstun et al. |
| 2012/0242603 A1 | 9/2012 | Engelhardt et al. |
| 2012/0331546 A1 | 12/2012 | Falkenburg et al. |
| 2013/0093683 A1 | 4/2013 | Hu et al. |
| 2013/0106722 A1 | 5/2013 | Shahparnia et al. |
| 2013/0106760 A1 | 5/2013 | Pedersen et al. |
| 2013/0113763 A1 | 5/2013 | Nungester et al. |
| 2014/0078101 A1 | 3/2014 | Katsurahira |
| 2014/0184567 A1 | 7/2014 | Zachut |
| 2014/0253462 A1 | 9/2014 | Hicks |
| 2014/0256250 A1 | 9/2014 | Cueto et al. |
| 2014/0340318 A1 | 11/2014 | Stringer |
| 2015/0009187 A1 | 1/2015 | Mercea et al. |
| 2015/0035797 A1 | 2/2015 | Shahparnia |
| 2015/0049028 A1 | 2/2015 | Pollmann et al. |
| 2015/0116271 A1 | 4/2015 | Shahparnia et al. |
| 2015/0153845 A1 | 6/2015 | Chang et al. |
| 2015/0205367 A1 | 7/2015 | Bandt-Horn |
| 2015/0277587 A1* | 10/2015 | Chandran ............ G06F 3/0416 345/173 |
| 2015/0346890 A1 | 12/2015 | Zachut |
| 2015/0363012 A1 | 12/2015 | Sundara-Rajan et al. |
| 2015/0363067 A1 | 12/2015 | Winebrand |
| 2016/0014598 A1 | 1/2016 | Westhues |
| 2016/0246390 A1* | 8/2016 | Lukanc ................ G06F 3/0383 |
| 2016/0320918 A1 | 11/2016 | Hara |

OTHER PUBLICATIONS

Final Rejection, dated Dec. 22, 2016, for U.S. Appl. No. 15/069,852, Fleck et al., "System and Method for Bidirectional Communication Between Stylus and Stylus Sensor Controller," 18 pages.

Notice of Allowance, dated May 24, 2016, for U.S. Appl. No. 15/069,793, Fleck et al., "System and Method for Bidirectional Communication Between Stylus and Stylus Sensor Controller," 12 pages.

\* cited by examiner

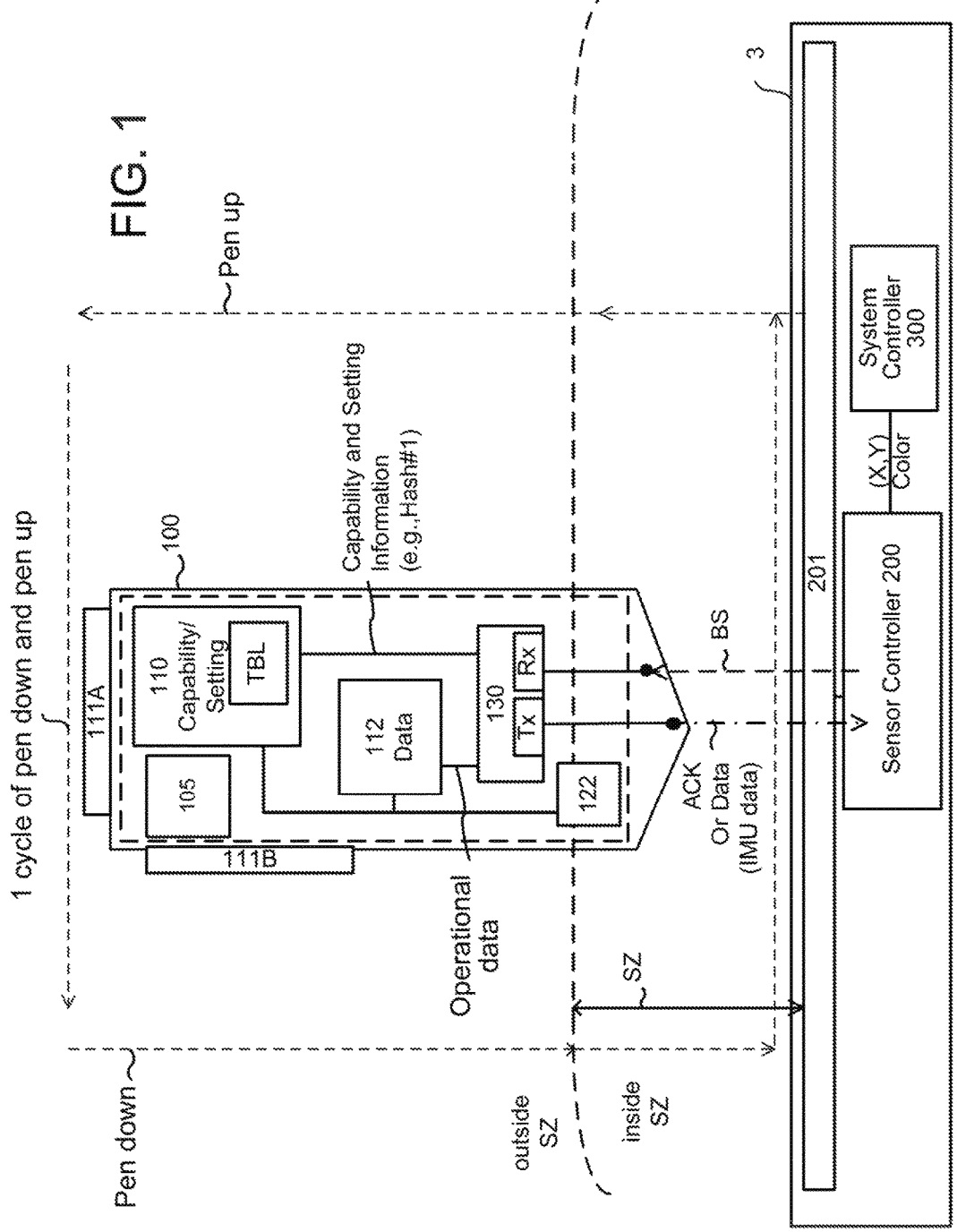

| Stylus capability information (Capability (CAPA) and SEtting (SET) Information) | | | |
|---|---|---|---|
| Name | Required | Size (bits) | |
| VendorID (VID) | Y | 8 | CAPA/SET |
| Serial Number (SN) | Y | 56 [vendor assigned] | CAPA } 64-bit unique global ID |
| Preferred Color (Col) | Y or N | 8 [140 named CSS colors] | CAPA/SET |
| Style (Styl) (Line Width (LW), Brush Type (Btype)) | N | 3 | SET |
| Tail/barrel Buttons (functions) | - | N/A | |
| Version (Ver) | N or Y | 4 | CAPA |
| Other capabilities/settings | | 10 – 44 (see FIG. 4B) | CAPA/SET |

FIG. 4A

Stylus capability information
(Capability (CAPA) and SEtting (SET) Information)

| Data Item | Bits | Definition |
|---|---|---|
| Pressure Levels (PL) | 3 | # bits – 8, 0 = 256 levels, 1 = 512, 2 = 1024, ... 7 = custom |
| Barrel Buttons (BB) | 2 | # of buttons 0 - 2, 3 = custom |
| Tangential Pressure flag (TaPf) | 1 | 0 = no, 1 = yes, levels = tip levels above |
| Orientation Code (ORC) | 3 | See. FIG. 4C |
| Custom Data flag (CDf) | 1 | 0 = none, 1 = yes |
| Orientation Resolution (ORR) | 0 to 2 | Only included if Orientation Code > 0<br>0 = 8 bit, 1 = 9 bit, 2 = 10 bit |
| Custom Pressure Size (CPS) | 0 or 8 | Only included of Pressure Levels = 7<br>Number of bits of pressure level |
| Custom Buttons Size (CBS) | 0 or 8 | Only included if Barrel Buttons = 3<br>Indicates the number of buttons up to 256 |
| Custom Orientation Size (COS) | 0 or 8 | Only included if Orientation Code = 7<br>Indicates the number of orientation bytes |
| Custom Data Size (CDS) | 0 or 8 | Only included if Custom Data = 1<br>Indicates the number of custom data bytes |

FIG. 4B

| Stylus capability information (Capability (CAPA)) | | |
|---|---|---|
| Orientation Code (ORC) | Orientation Data Supplied | # of timeslots per frame |
| 0 | | 0 |
| 1 | X tilt & Y tilt (2D) | 2 |
| 2 | X tilt, Y tilt, & twist (3D) | 3 |
| 3 | Altitude & Azimuth (2D) | 2 |
| 4 | Altitude, Azimuth, & Twist (3D) | 3 |
| 5 | 6 axis IMU [accelerometer & gyro] | ⋮ |
| 6 | 9 axis IMU (e.g., 9 x 8 bits = 72bits) | 3 or more |
| 7 | Custom | - |

FIG. 4C

| Stylus capability information (Capability (CAPA)) | | |
|---|---|---|
| Data Item | Bit | Definition |
| hasBarrelPressure_flag | 1 | 0: Stylus does not have sensor, 1: Stylus has sensor |
| hasX-Y-Tilt_flag | 1 | 0: Stylus does not have sensor, 1: Stylus has sensor |
| hasTwist_flag | 1 | 0: Stylus does not have sensor, 1: Stylus has sensor |
| hasAltitude&Azimuth | 1 | 0: Stylus does not have sensor, 1: Stylus has sensor |
| IMUhasAccel_flag | 1 | 0: Stylus does not have sensor, 1: Stylus has sensor |
| IMUhasGyro_flag | 1 | 0: Stylus does not have sensor, 1: Stylus has sensor |
| IMUhasMagnet_flag | | |
| ... | ... | ... |

FIG. 4D

```
Example 1:
010     // 1024 levels of tip pressure
01      // 1 barrel button
0       // no tangential pressure
000     // no orientation
(0      // no custom)

Example 2:
011     // 2048 levels of tip pressure
10      // 2 barrel buttons
1       // has tangential pressure
110     // 9 axis IMU]
(0      // no custom)

Example 3:
111           // custom number of pressure levels
00            // no barrel buttons
0             // no tangential pressure
100           // has altitude, azimuth, and twist
00000100      // has 16 bit pressure
```

FIG. 4E

2-1) Interactive Data (Transmitted per schedule)

| Name | Required | Size (bits) |
|---|---|---|
| Tip Pressure (TiP) | Y | 8 – 256 [typically 8 – 11 bits] |
| Tangential Pressure (TaP) | N | 0 - 256 |
| Barrel Buttons (BB) | Y | 2 – 256 [typically 2 bits] |
| Invert (Inv) | Y | 1 |
| Orientation (OR) | N | 0 – 72 [Additional or other timeslots] |
| Custom Data (CD) | N | 0 -256 |

FIG. 5A

| 2-1) Interactive Data (IMU data) (Transmitted per schedule) ||
|---|---|
| Name | Size (bits) |
| IMU Flag | 2 |
| End | 1 |
| IMU data | 13 |

FIG. 5B

| 2-2) Infrequent Data (Transmitted when polled) |||
|---|---|---|
| Name | Required | Size (bits) |
| Battery Level (BL) | Y | 4 |
| ⋮ | ⋮ | ⋮ |

FIG. 5C

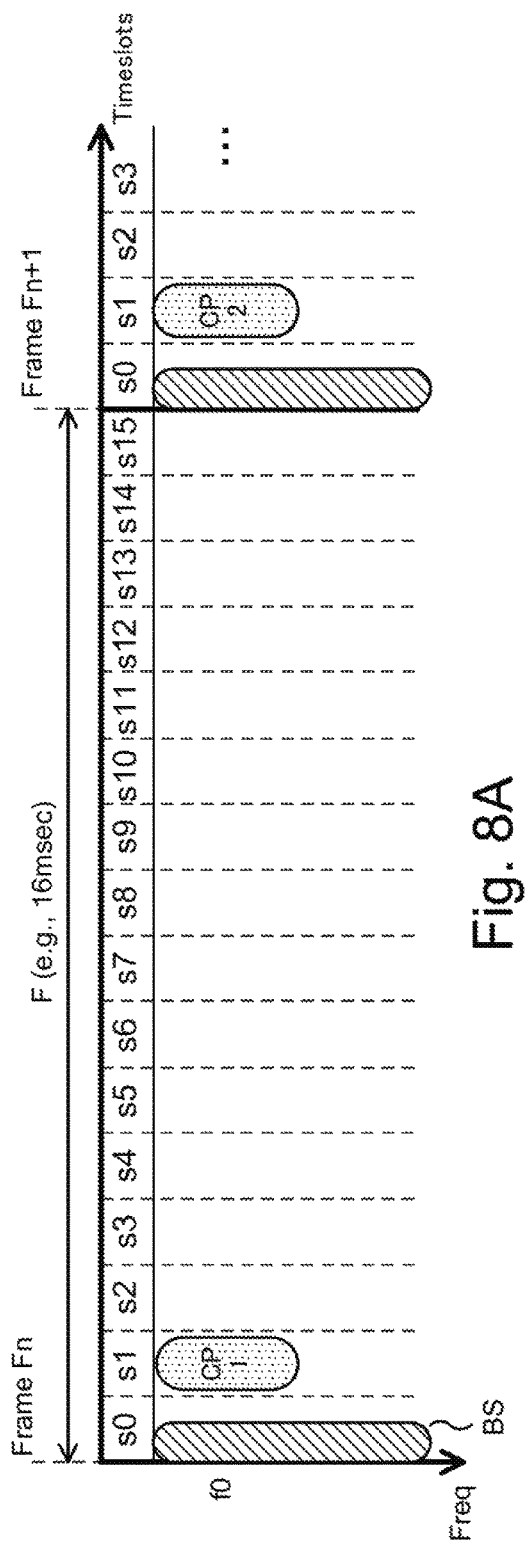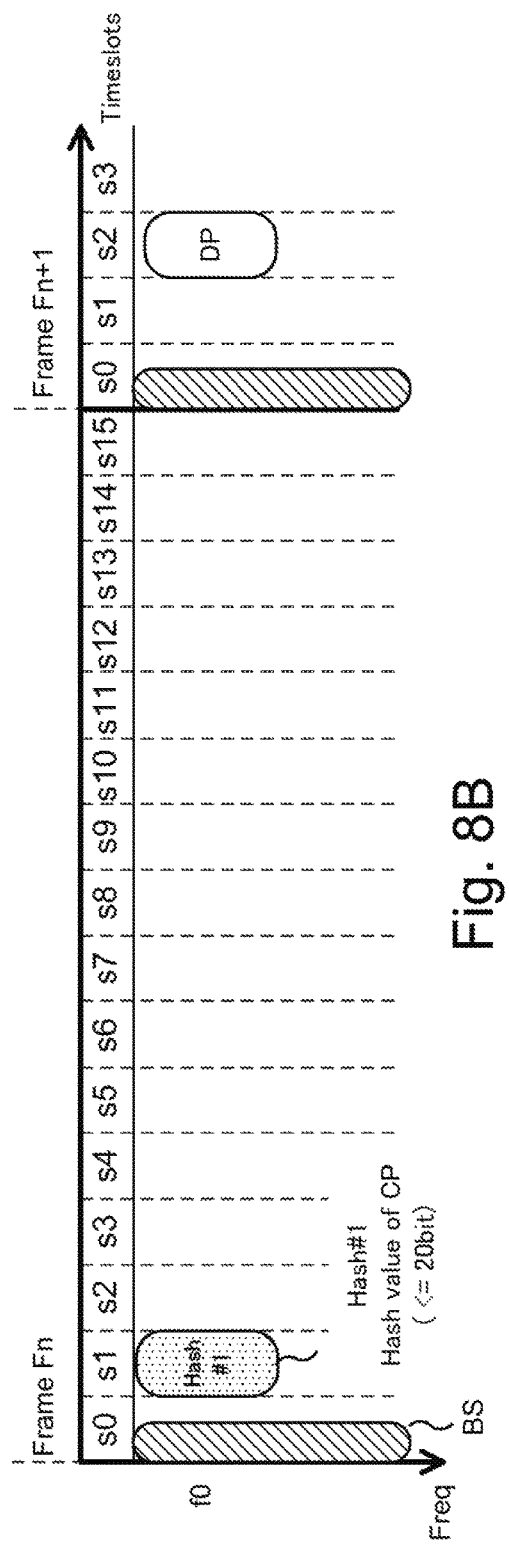

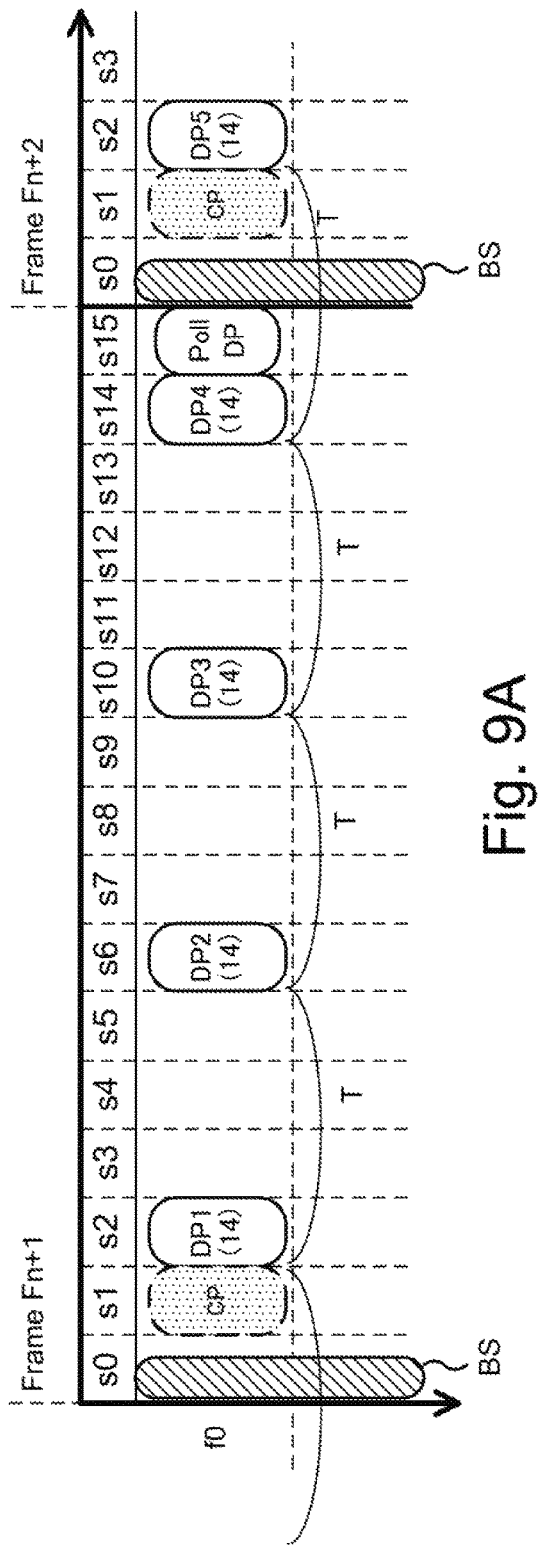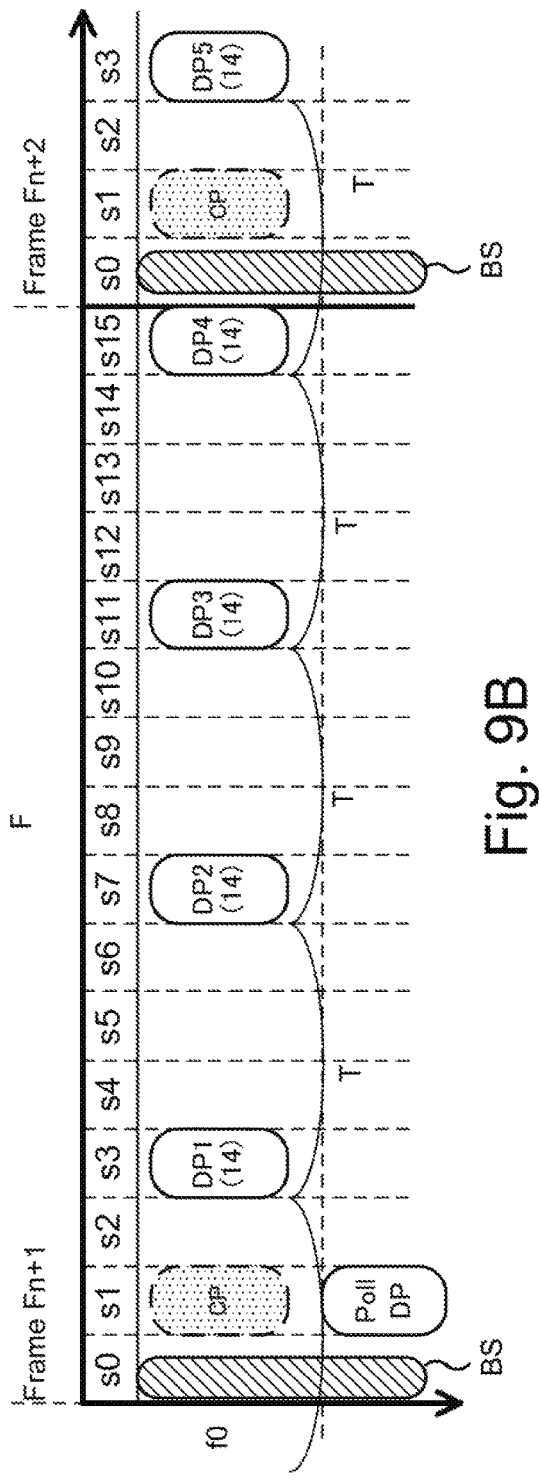
Fig. 9A
Fig. 9B

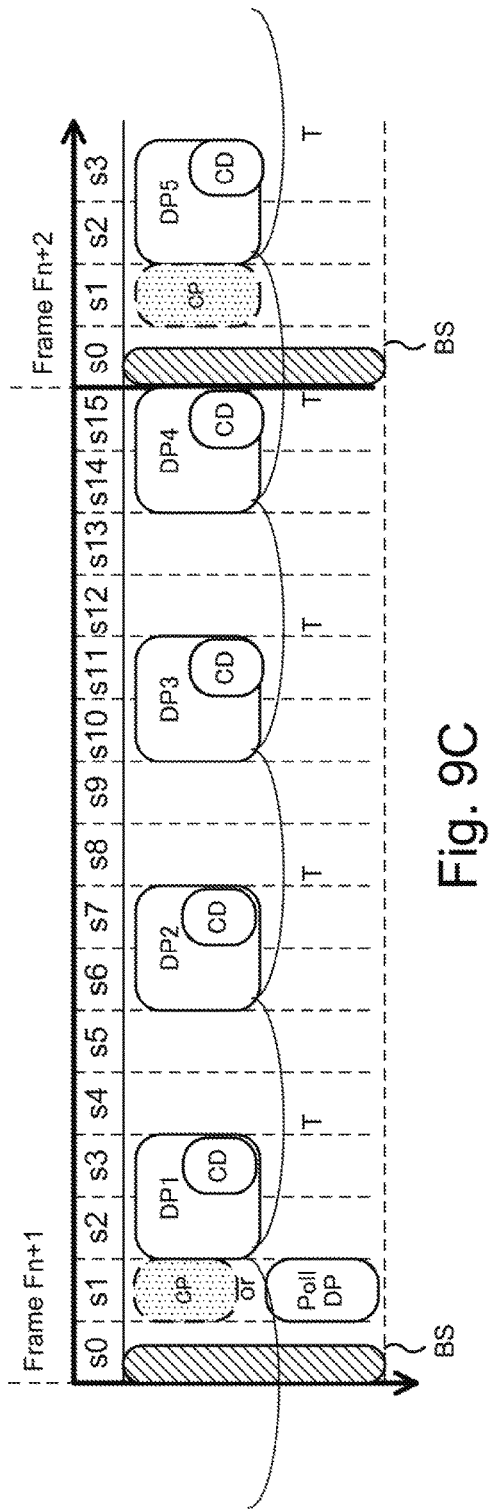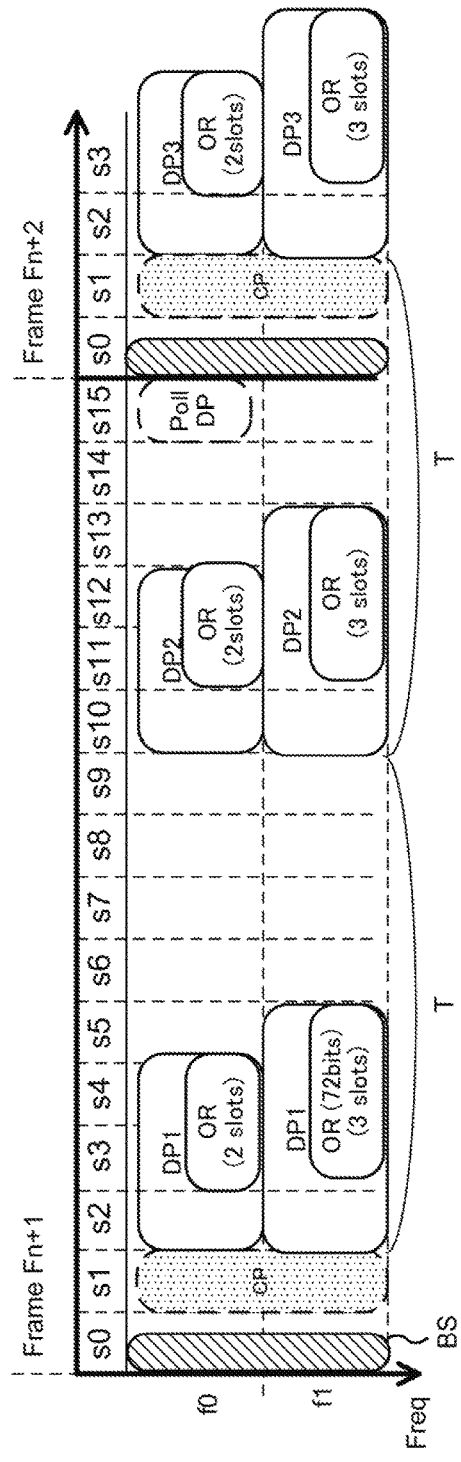

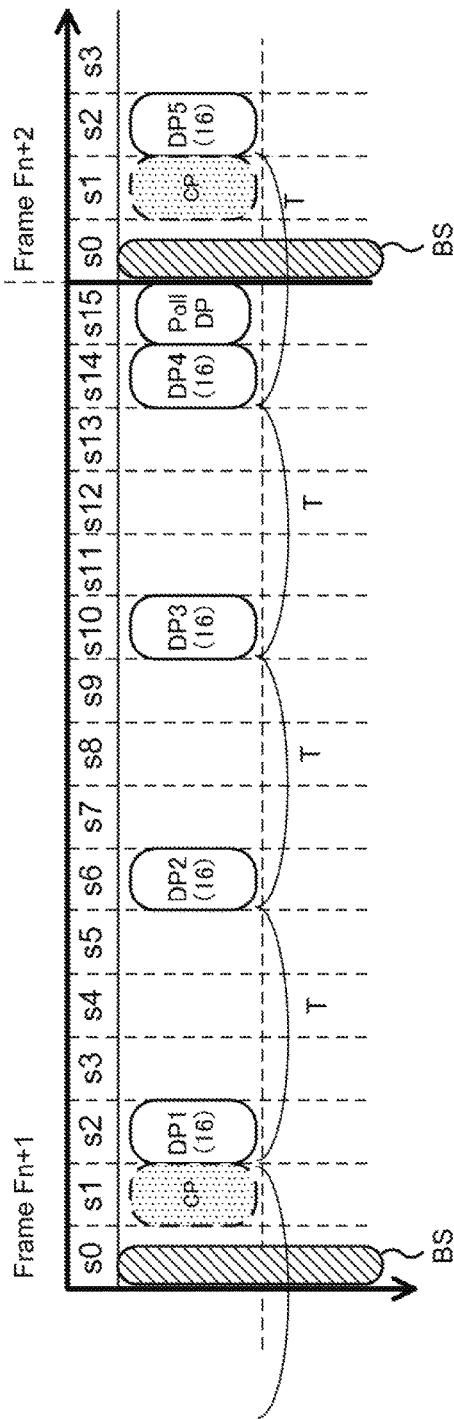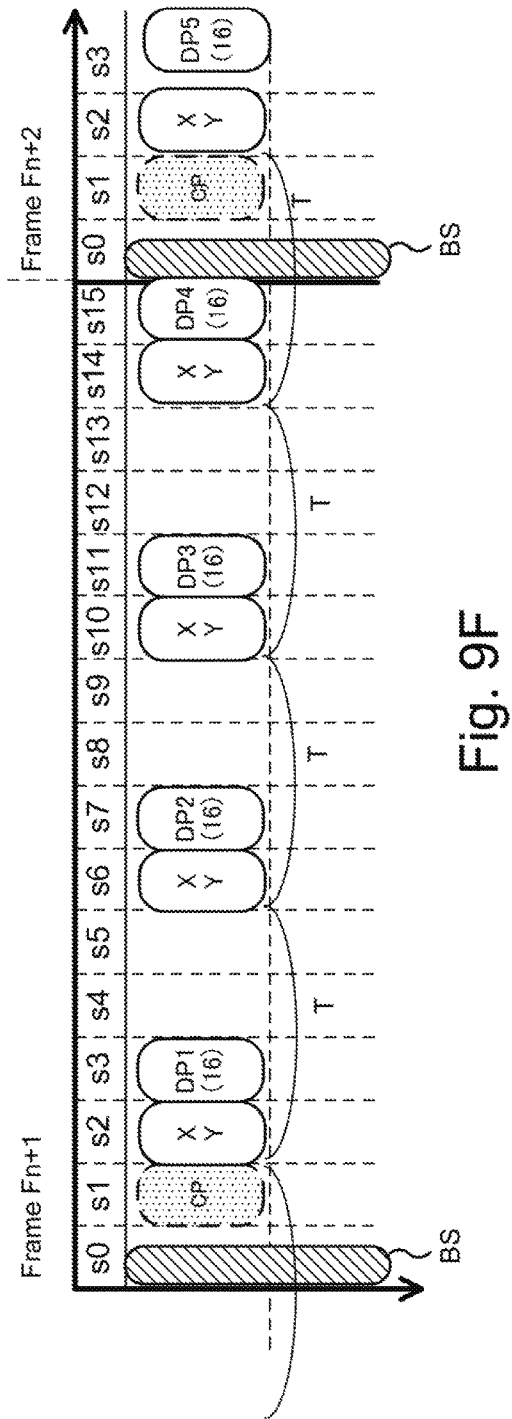

SYSTEM AND METHOD FOR BIDIRECTIONAL COMMUNICATION BETWEEN STYLUS AND STYLUS SENSOR CONTROLLER

CROSS-REFERENCE TO RELATED APPLICATIONS

The present application claims priority to U.S. Provisional Patent Application No. 62/149,907, entitled "Position Input Method, Position Input System, Sensor Controller and Stylus," filed Apr. 20, 2015; U.S. Provisional Patent Application No. 62/162,527, entitled "Position Input Method, Position Input System, Sensor Controller and Stylus," filed May 15, 2015; U.S. Provisional Patent Application No. 62/243,427, entitled "Position Input Method, Position Input System, Sensor Controller and Stylus," filed Oct. 19, 2015; and U.S. Provisional Patent Application No. 62/291,373, entitled "System and Method for Bidirectional Communication Between Stylus and Stylus Sensor Controller," filed Feb. 4, 2016, the entirety of which are hereby incorporated by reference.

BACKGROUND

Technical Field

The present application relates to an active stylus, a sensor controller for a stylus sensor, and a position input system and method based on such stylus and sensor controller; and more particularly to a position input system and method that utilize a bidirectional communications protocol between the stylus and the sensor controller.

Description of the Related Art

Various types of styluses are available that allow users to handwrite text and graphics on stylus-sensitive screens (sensors) of electronic devices, such as tablet computers, smart phones, etc. For example, an active electrostatic (capacitive) stylus includes a power source and a signal processor, and transmits signal by providing an electric charge corresponding to the transmission signal to an electrode provided at a tip of the stylus, to thereby cause a change in an electric field at or near a position indicated (pointed to) by the tip. A stylus-sensitive screen (sensor) of an electronic device includes a matrix of X- and Y-electrodes, and the above-described change in the electric field created by the stylus tip induces a corresponding change in an electric charge in the matrix electrodes at or near the stylus tip. A sensor controller coupled to the sensor and/or a host processor of the electronic device detects such change in the electric charge in the matrix electrodes to thereby detect the transmission signal from the stylus. The sensor controller and/or the host processor then determine the position indicated by the stylus on the sensor based on the location of the matrix electrodes that detected the transmission signal.

Different types of active styluses have different stylus capabilities or functions, such as pen (stylus) tip pressure detection capability, how many different levels the pen (tip) pressure can be detected, pen orientation detection capability including pen twist (rotation) detection capability and pen tilt detection capability, different numbers and kinds of barrel buttons (switches) provided on the styluses, etc. Typically, a data format used in communication from a stylus to a sensor controller is rigidly configured in a given stylus-sensor system and incapable of supporting different and expanding variations of stylus capabilities and functions.

While it is possible for each stylus to always transmit its entire capability information to the sensor controller each time the stylus is used with (i.e., enters the sensing zone of) the sensor controller, such transmission of the entire capability information would take up multiple time slots or frames available in a given communications protocol. In a typical situation where one or more styluses are constantly entering and exiting the sensing zone of the sensor controller, the sensor controller may not be able to quickly acquire the capability information of each entering stylus to start communication with the stylus in a manner appropriate for the stylus's particular capability. This may lead to slow response time of the sensor controller and hence delay in establishing communication between the sensor controller and the active stylus. For example, the sensor controller may not be able to promptly receive pen orientation data from a stylus, even when the stylus is fully capable of transmitting such orientation data, simply because the sensor controller cannot quickly ascertain the stylus's orientation detection capability.

BRIEF SUMMARY

Embodiments of the invention offer a technical solution that allows a sensor controller to quickly determine the capability information of one or more active styluses that enter the sensing zone to thereby start bidirectional communication with the styluses. The embodiments are particularly suited to provide a universal stylus-sensor controller interface, which supports different active styluses having different capability information.

According to one aspect, a method is provided for interfacing an active stylus with a sensor controller. The sensor controller is coupled to a sensor configured to receive input from the active stylus. The sensor controller defines data frames consisting of more than one time slot usable for receiving packets from the stylus. The active stylus transmits, in response to a request from the sensor controller, a signal including stylus capability information. The sensor controller determines, based on the stylus capability information, a downlink time slot allocation for use by the active stylus to transmit packets to the sensor controller. The sensor controller transmits the downlink time slot allocation to the active stylus.

According to a further aspect, the stylus capability information includes at least one of: a) capability information regarding predefined capability of the active stylus, and b) setting information regarding user-adjustable setting of the active stylus.

According to a further aspect, the capability information includes at least one of: i) whether the active stylus is capable of sensing stylus orientation, ii) whether the active stylus is capable of sensing barrel pressure, iii) whether the active stylus has a vendor-specific feature, iv) whether the active stylus has a preferred color, and v) a global ID of the active stylus.

According to a further aspect, the setting information includes at least one of: i) stylus line width, ii) stylus tip type, iii) color, and iv) a unique identifying number of the active stylus.

According to a further aspect, the setting information includes a color indication or a unique identifying number of the active stylus, which is changeable by a user through one or more switches located on the stylus.

According to a further aspect, the downlink time slot allocation includes at least one of: i) which downlink time slots in a frame are allocated to the active stylus, and ii) what types of packets the active stylus is to transmit in what downlink time slots.

According to a further aspect, the downlink time slot allocation includes: i) an offset value indicative of a starting time slot for use by the active stylus, and ii) an interval value indicative of intervals between time slots allotted to the active stylus beginning with the starting time slot.

According to a further aspect, the active stylus that has received the downlink time slot allocation transmits packets in the time slots allotted according to the downlink time slot allocation. The packets may be one of: i) a data packet including operational data indicative of operational state of the active stylus, and ii) a non-data packet used by the sensor controller to calculate a position of the active stylus relative to the sensor.

According to a further aspect, the operational data included in data packets includes one or more of: i) stylus tip pressure data, ii) barrel pressure data, iii) stylus orientation data, iv) stylus barrel switch state data, and v) stylus battery level.

According to another aspect, a sensor controller is provided, which is to be coupled to a sensor, which is configured to receive input from an active stylus. The sensor controller includes a processor which, in operation, defines data frames consisting of time slots for communication between the active stylus and the sensor controller; receives a signal including stylus capability information of the active stylus from the active stylus; and determines, based on the received stylus capability information, a downlink time slot allocation for use by the active stylus to transmit packets to the sensor controller. The sensor controller further includes a transmission controller coupled to the processor. The transmission controller, in operation, causes transmission of the downlink time slot allocation to the active stylus.

According to a further aspect, an active stylus is provided. The active stylus includes a receiver which, in operation, receives periodic beacon signals transmitted from a sensor controller coupled to a sensor that is configured to receive input from the active sensor. The beacon signals serve as timing reference for time slots used in bidirectional communication between the active stylus and the sensor controller. The active stylus also includes a processor coupled to the receiver to detect the beacon signal and prepare a signal including stylus capability information of the active stylus. The active stylus further includes a transmitter coupled to the processor to transmit the signal including the stylus capability information to the sensor controller. The receiver of the active stylus, in operation, receives from the sensor controller a downlink time slot allocation. The transmitter of the active stylus, in operation, transmits packets to the sensor controller in the time slots allotted to the active stylus according to the downlink time slot allocation.

According to a further aspect, a system is provided, which includes: (a) a sensor, (b) a sensor controller coupled to the sensor, and (c) an active stylus. The sensor controller includes a transmission controller, which causes transmission of periodic beacon signals, and a sensor processor coupled to the transmission controller. The active stylus includes a receiver, which receives the periodic beacon signals. The active stylus also includes a stylus processor coupled to the receiver to detect the beacon signal and to prepare a signal including stylus capability information of the active stylus. The active stylus further includes a transmitter coupled to the stylus processor to transmit the signal including the stylus capability information to the sensor controller. The sensor controller determines, based on the received stylus capability information of the active stylus, a downlink time slot allocation for use by the active stylus to transmit packets to the sensor controller, and transmits the downlink time slot allocation to the active stylus.

BRIEF DESCRIPTION OF THE SEVERAL VIEWS OF THE DRAWINGS

FIG. 1 is a diagram illustrating an overall system including an active stylus and an electronic device (e.g., tablet computer), wherein the electronic device includes a sensor, a sensor controller coupled to the sensor, and a system controller (host processor) of the electronic device coupled to the sensor controller.

FIG. 4A is a table listing sample types of stylus capability information of an active stylus, including capability information regarding predefined (preconfigured) capability of the active stylus and setting information regarding user-adjustable setting of the active stylus.

FIG. 4B is a table listing a sample data format for use by an active stylus to transmit capability information of the active stylus to the sensor controller.

FIG. 4C is a table listing sample orientation codes for use by an active stylus to transmit capability information regarding orientation detection capability of the active stylus.

FIG. 4D is another example of a table listing capability information, in particular, orientation detection capability of the active stylus.

FIG. 4E describes three examples of stylus capability information regarding predefined capability of an active stylus.

FIG. 5A is a table listing sample operational data indicative of an operational state of an active stylus, which is transmitted from the active stylus to the sensor controller according to a schedule set by a downlink time slot allocation.

FIG. 5B is a table showing a downlink data packet format for one type of operational data, i.e., IMU (inertial measurement unit) data.

FIG. 5C is a table listing sample operational data indicative of an operational state of an active stylus, which is transmitted to the sensor controller when polled (requested) by the sensor controller.

FIGS. 8A and 8B illustrate sample frame formats, in which a sensor controller transmits a beacon signal (BS) to an active stylus, and the active stylus, in response, transmits a signal including stylus capability information (CP or Hash#1) back to the sensor controller.

FIGS. 9A-9G illustrate seven different frame formats, in which an active stylus transmits packets to the sensor controller according to six different kinds of downlink time slot allocation specified by the sensor controller, respectively.

DETAILED DESCRIPTION

Figure 2A:
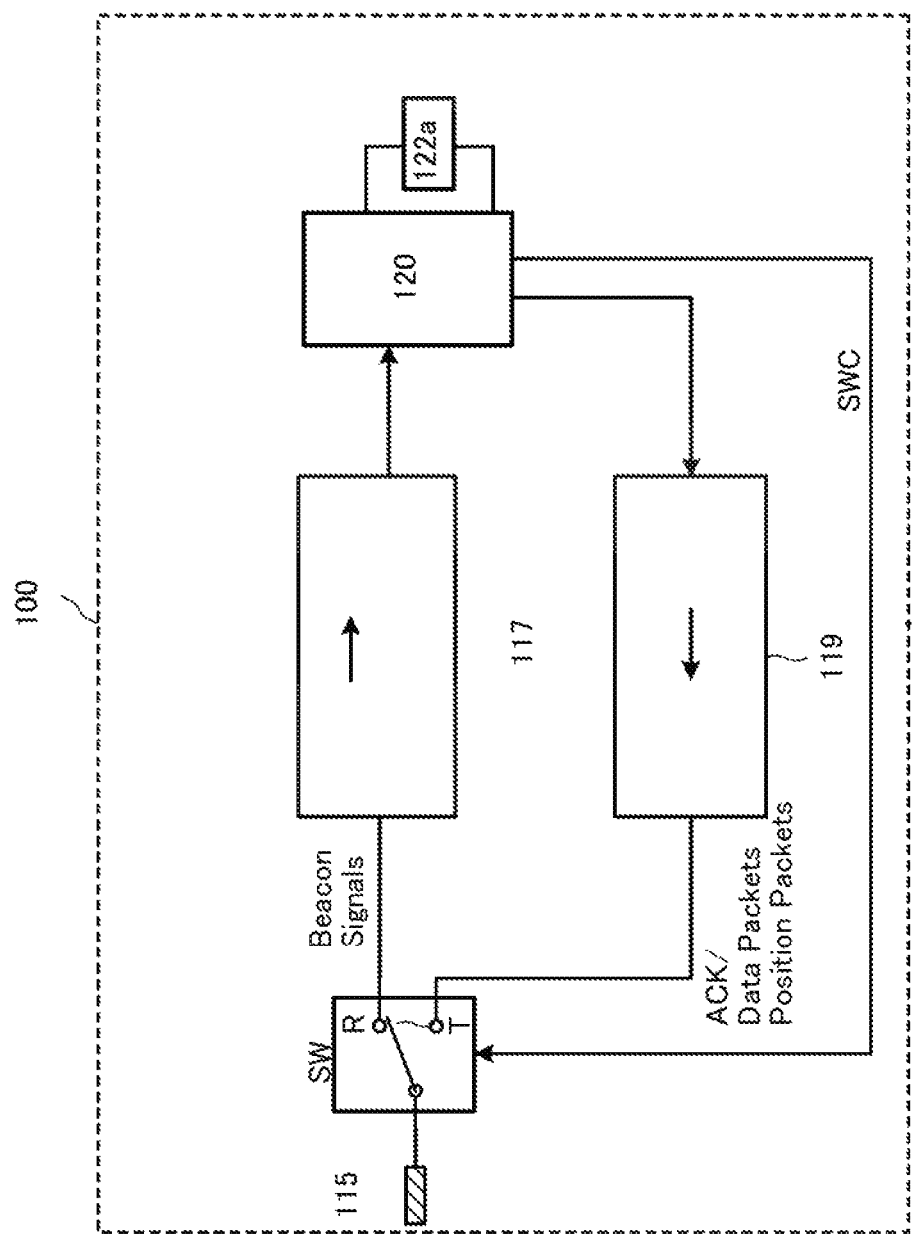
FIG. 2A is a functional block diagram of a sample active stylus.

FIG. 1 illustrates an overall system including an active stylus 100 and an electronic device (e.g., PC, tablet computer, smartphone) 3. The electronic device 3 includes a sensor 201, a sensor controller 200 coupled to the sensor 201, and a system controller (host processor) 300 of the electronic device 3 coupled to the sensor controller 200.

The electronic device 3, such as a PC, tablet computer, smartphone, etc., typically includes a screen that underlies or overlies the sensor 201, and a user operates the active stylus 100 to handwrite text and graphics on the screen. As used herein, an active stylus is a stylus that contains electronics and a power source 105, such as a battery or a parasitic energy conduit. The sensor 201 may be any suitable stylus sensitive sensor known in the art, such as a capacitive touch/stylus sensor, resistive touch/stylus sensor, electromagnetic resonance stylus sensor, optical stylus sensor, ultrasonic stylus sensor, etc. Some are stylus sensors, while others are sensors capable of detecting both an active stylus and a finger touch. The sensor controller 200, which will be described in detail in reference to FIG. 2B below, controls operation of the sensor 201, performs bidirectional communication with the active stylus 100, and also communicates with the host processor 300. For example, the sensor controller 200 processes handwritten input data from the active stylus 100 to determine the (X,Y) coordinates and color of a position indicated (pointed to) by the active stylus 100 on the sensor 201, and forwards the (X,Y) coordinates and color information to the host processor 300 of the electronic device 3.

The active stylus 100, which will be described in detail in reference to FIG. 2A below, includes a stylus capability information manager 110 including memory/cache that stores stylus capability information of the stylus, for example, in the form of tables (TBL). As will be more fully described below, the stylus capability information may include capability information regarding predefined (e.g., manufacturer-configured) capability of the stylus, which is typically not changeable, and setting information regarding user-adjustable setting of the stylus. The stylus capability information manager 110 updates the setting information each time a user changes the stylus setting, such as the stylus color and stylus line width, using, for example, switches (buttons) 111 provided on the stylus 100. In FIG. 1, two such buttons are illustrated: one tail button 111A and one side button 111B. The active stylus 100 also includes a data manager 112, which prepares operational data indicative of operational state of the active stylus, such as stylus (pen) tip pressure data and stylus orientation data (e.g., how much the stylus is twisted or tilted relative to the sensor surface).

The stylus capability information manager 110 and the data manager 112 are both coupled to a communication module 130 including transmission (TX) and reception (RX) circuitry. The communication module 130 transmits the stylus capability information and operational data of the active stylus 100 to the sensor controller 200, and receives various commands and other information (in beacon signals) from the sensor controller 200, as will be more fully described below. In this bidirectional communication protocol, the sensor controller 200 is a master device and the active stylus 100 is a slave device. In the present disclosure, the transmission direction from the sensor controller 200 to the active stylus 100 is called "uplink" and the transmission direction from the active stylus 100 to the sensor controller 200 is called "downlink."

As schematically illustrated in FIG. 1, a typical bidirectional communication flow between the active stylus 100 and the sensor controller 200 starts with the active stylus 100 entering the sensing zone (SZ) of the sensor controller 200 during pen-down operation indicated by a down arrow. Once the active stylus 100 is inside the sensing zone, it can detect beacon signals periodically transmitted from the sensor controller 200 via the sensor 201. Upon detecting the beacon signal, the active stylus 100 transmits a response signal, which includes the stylus capability information retrieved from the stylus capability information manager 110. As will be described in detail in reference to FIG. 10 below, the setting information of the active stylus 100 may be hashed to generate a hash value of fixed (smaller) size ("Hash#1"), which can be advantageously transmitted in one time slot to the sensor controller 200. Hash#1 has a corresponding hash value of fixed size ("Hash#2"). If the active stylus 100 has previously been paired with the sensor controller 200, then both the active stylus 100 and the sensor controller 200 have Hash#1 and Hash#2, which are calculated from the particular setting information of the active stylus 100 when it was paired with the sensor controller 200. Therefore, if the sensor controller 200 recognizes the received Hash#1, the sensor controller 200 knows that it was previously paired with the active stylus 100 and, thus, is already aware of the stylus capability information of the active stylus 100 including the particular setting information. The sensor controller 200 can then use the same downlink time slot allocation as previously assigned to the active stylus 100 to start bidirectional communication with the active stylus 100. In addition the sensor controller 200 may return Hash#2, which corresponds to the received Hash#1, to the active stylus 100 to verify that it has correctly recognized the active stylus 100. As will be more fully described below, use of Hash#1 speeds up the pairing process between the active stylus 100 and the sensor controller 200 each time the active stylus 100 reenters the sensing zone of the sensor controller 200, which is a particularly advantageous technical feature when the active stylus 100 repeatedly exits (see "Pen up" arrow) and reenters (see "Pen down" arrow) the sensing zone.

As used herein, "pairing" operation refers to a process that starts with transmission of a response signal from the active stylus 100, which has detected an initial (discovery) beacon signal from the sensor controller 200, and ends with transmission of another beacon signal including a downlink time slot allocation for the active stylus 100 from the sensor controller 200. The sensor controller 200 determines a downlink time slot allocation for a given active stylus in view of the stylus capability information of the active stylus, to thereby establish a unique communication link, fully supportive of the stylus capability, with the active stylus. Thus, at the conclusion of pairing operation, the active stylus may start bidirectional communication with the sensor controller using the newly established unique communication link.

Use of Hash#1 is also advantageous in achieving "fast inking." Before an application program can start to draw, it needs to know the parameters for the line it is about to render on a screen. These parameters include, for example, the color or the brush style (airbrush, chalk, etc.) of the line. Use of Hash#1 allows a sensor controller to quickly recognize that it already has these parameters cached for a particular stylus that has entered the sensing zone, and to make these parameters available to the application program to start drawing, or "inking," almost immediately.

FIG. 2A is a functional block diagram of a sample active stylus 100. The active stylus 100 includes a TX/RX electrode 115 at its tip, switch SW coupled to the TX/RX electrode 115, reception circuitry 117, transmission circuitry 119, and a micro-controller unit (MCU) 120. The MCU 120 is a microprocessor including internal ROM and RAM and configured to operate according to a defined program. Switch SW couples the TX/RX electrode 115 to either a reception terminal R or a transmission terminal T as directed by switch control signal SWC from the MCU 120. Initially switch SW connects the TX/RX electrode 115 to the reception terminal R while the active stylus 100 listens for beacon signals from the sensor controller 200. The reception circuitry 117 includes electronic components necessary to receive and process signals from the TX/RX electrode 115 and output them in digital form usable by the MCU 120. When the MCU 120 detects a beacon signal from the sensor controller 200, it prepares a response signal (e.g., an ACK signal) in cooperation with the transmission circuitry 119, and also sends switch control signal SWC to switch SW to connect the TX/RX electrode 115 to the transmission terminal T to transmit the response signal via the TX/RX electrode 115 to the sensor controller 200.

The transmission circuitry 119 includes electronic components necessary to receive and process signals from the MCU 120 and output them to be transmitted via the TX/RX electrode 115 to the sensor controller 200. For example, the transmission circuitry 119 generates a carrier signal at a frequency specified by the MCU 120 and may output the carrier signal, without modulation, as "position packets" to be used by the sensor controller 200 to determine (calculate) a position indicated by the active stylus 100. Alternatively, the transmission circuitry 119 may modulate the carrier signal with the stylus capability information of the active stylus 100, such as Hash#1 indicative of the setting information, using any suitable modulation schemes such as PSK (phase shift keying), D-BPSK (differential binary PSK), QAM (quadrature amplitude modulation) and DSSS (direct sequence spread spectrum). Then the signal modulated with the stylus capability information is transmitted via the TX/RX electrode 115 to the sensor controller 200.

The transmission circuitry 119 may modulate the carrier signal with information other than the stylus capability information, such as operational data indicative of operational state of the active stylus 100. Operational data may include, for example, stylus (pen) tip pressure data, stylus barrel pressure data, stylus orientation (e.g., twist/tilt) data, stylus switch status, and stylus battery level. To generate such operational data, the active stylus 100 includes one or more sensors 122, such as a stylus (pen) tip pressure sensor 122a (e.g., comprised of a variable capacitor) configured to sense pressure applied to the stylus tip, barrel pressure sensor configured to sense pressure applied to the stylus barrel, 9-axis or lesser-axis IMU (inertial measurement unit) 122b (consisting of one or more combinations of 3-axis gyroscopes, 3-axis accelerometers, and 3-axis magnetometers), twist sensor 122c configured to sense twist/rotation of the active stylus 100 about its axis relative to the direction of each of X electrodes (or Y electrodes) of the sensor 201, tilt sensor 122d configured to sense X- and Y-directional tilt of an axis of the active stylus 100 relative to the surface of the sensor 201, etc. (Illustration of the sensors 122b-122d other than the stylus tip pressure sensor 122a is omitted). The MCU 120 and the transmission circuitry 119 prepare outputs from these sensors into "data packets" to be transmitted via the TX/RX electrode 115 to the sensor controller 200. To transmit the data packets to the sensor controller 200, the MCU 120 sends switch control signal SWC to switch SW to connect the TX/RX electrode 115 to the transmission terminal T.

Different active styluses have different sensing capabilities; some styluses are fully equipped with various sensors, while other styluses include only the stylus tip pressure sensor 122a. As will be more fully described below, the present invention proposes a bidirectional communication protocol that permits the sensor controller 200 to quickly ascertain the particular capability of a given active stylus entering the sensing zone, to thereby configure a unique communication link (based on a specific downlink time slot allocation) that is supportive of the stylus's capability.

Figure 2B:
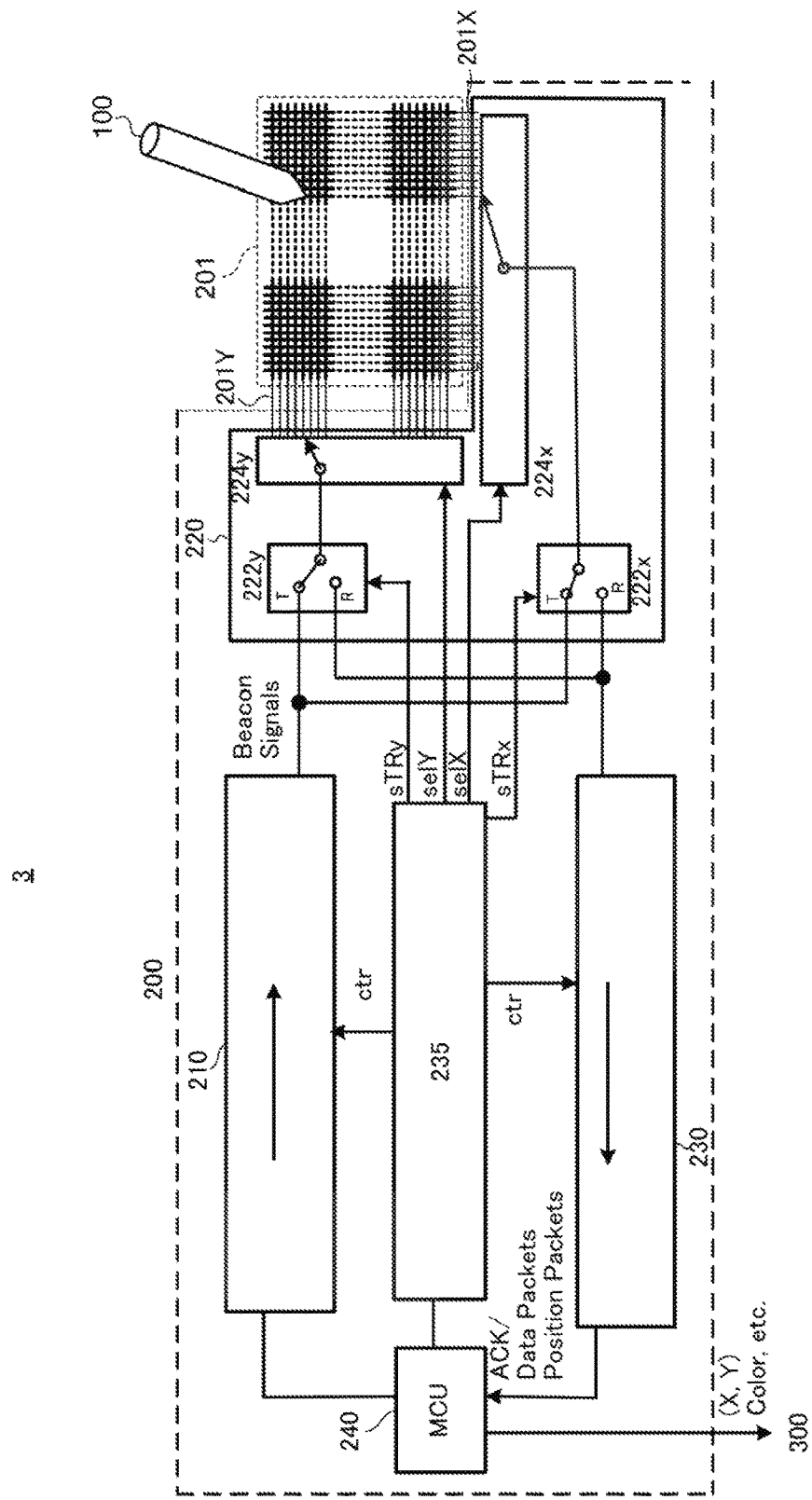
FIG. 2B is a functional block diagram of a sample sensor controller.

FIG. 2B is a functional block diagram of a sample sensor controller 200. The sensor controller 200 is part of the electronic device 3 (see FIG. 1) and is coupled to the sensor 201 including a matrix of X electrodes 201X and Y electrodes 201Y, on which the active stylus 100 carries out various handwriting operation. The sensor controller 200 is also coupled to the host processor 300 of the electronic device 3.

The sensor controller 200 includes transmission circuitry 210, a selector 220, reception circuitry 230, a logic unit 235, and an MCU (micro-controller unit) 240. The MCU 240 is a microprocessor including internal ROM and RAM and configured to operate according to a defined program. The MCU 240 directs the logic unit 235 to issue control signaling (ctr, sTRx, sTRy, selX, selY, etc.) to control operation of the transmission circuitry 210, selector 220 and reception circuitry 230. The MCU 240 processes digital data received from the reception circuitry 230 to determine/calculate the X- and Y-coordinates, color, opacity (darkness), etc., of a point indicated by the active stylus 100 on the sensor 201, and outputs the calculated point data to the host processor 300 of the electronic device 3 for display, for example.

The transmission circuitry 210 includes electronic components necessary to receive and process signals from the MCU 240 and output them to be transmitted via the matrix electrodes of the sensor 201 to the active stylus 100. Specifically, under the control of the MCU 240, the transmission circuitry 210 generates periodic beacon signals to be transmitted via the matrix electrodes of the sensor 201 to the active stylus 100. As will be more fully described below, beacon signals are used (detected) by nearby active styluses to discover the sensor controller 200 and serve as timing reference by the active styluses to synchronize with the sensor controller 200. Additionally, a beacon signal may include Hash#2, which the sensor controller 200 that has received Hash#1 from the active stylus 100 may transmit back to the active stylus 100 for verification, as described above. Beacon signals may include a downlink time slot allocation determined for the active stylus, to thereby notify the active stylus what downlink time slots to use to transmit what types of packets to the sensor controller. Further additionally, beacon signals may include various commands to control operation of the active stylus 100. For example, beacon signals may include a read command to request the active stylus 100 to transmit (additional) stylus capability information to the sensor controller 200, or a write command to configure (write in) capability information for the active stylus 100. Beacon signals may also include a polling command to request (poll) the active stylus to transmit operational data of the active stylus, such as a battery level of the active stylus, to the sensor controller. The transmission circuitry 210 may modulate a carrier signal that forms a beacon signal with Hash#2, with the downlink time slot allocation or with these various commands received from the MCU 240, using any suitable modulation schemes such as PSK, D-BPSK, QAM and DSSS.

The reception circuitry 230 includes electronic components necessary to process signals received from the active stylus 100 via the matrix electrodes of the sensor 201 and output them in digital form usable by the MCU 240. For example, the reception circuitry 230 processes and outputs response signals (in response to the beacon signals), data packets (including operational data of the active stylus) and position packets received from the active stylus 100 to the MCU 240. When the sensor 201 is capable of detecting a finger touch as well as the active stylus 100, the reception circuitry 230 receives via the matrix electrodes of the sensor 201 signals indicative of a finger touch as well as signals transmitted from the active stylus 100, and processes and outputs them to the MCU 240, which determines a finger touch position as well as a position indicated by the active stylus 100.

The selector 220, based on control signaling from the logic unit 235, switches operational modes of the sensor 201 between transmission mode and reception mode. The selector 220 includes switches 222x and 222y, and electrode selection circuitry 224x and 224y. Based on control signaling sTRy and sTRx from the logic unit 235, the switches 222x, 222y connect the X-electrodes 201X and Y-electrodes 201Y of the sensor 201, respectively, to either a transmission terminal T coupled to the transmission circuitry 210 or a reception terminal R coupled to the reception circuitry 230. The electrodes coupled to the transmission circuitry 210 are used in transmission mode to transmit signals to the active stylus 100, and the electrodes coupled to the reception circuitry 230 are used in reception mode to receive signals from the active stylus 100. Further, based on control signaling selX and selX, the electrode selection circuitry 224x and 224y select X-electrodes 201X and Y-electrodes 201Y, respectively, to transmit or receive signals to or from the active stylus 100. The logic unit 235 additionally sends control signaling "ctr" to the transmission circuitry 210 and the reception circuitry 230 to control their operation as directed by the MCU 240.

Figure 3:
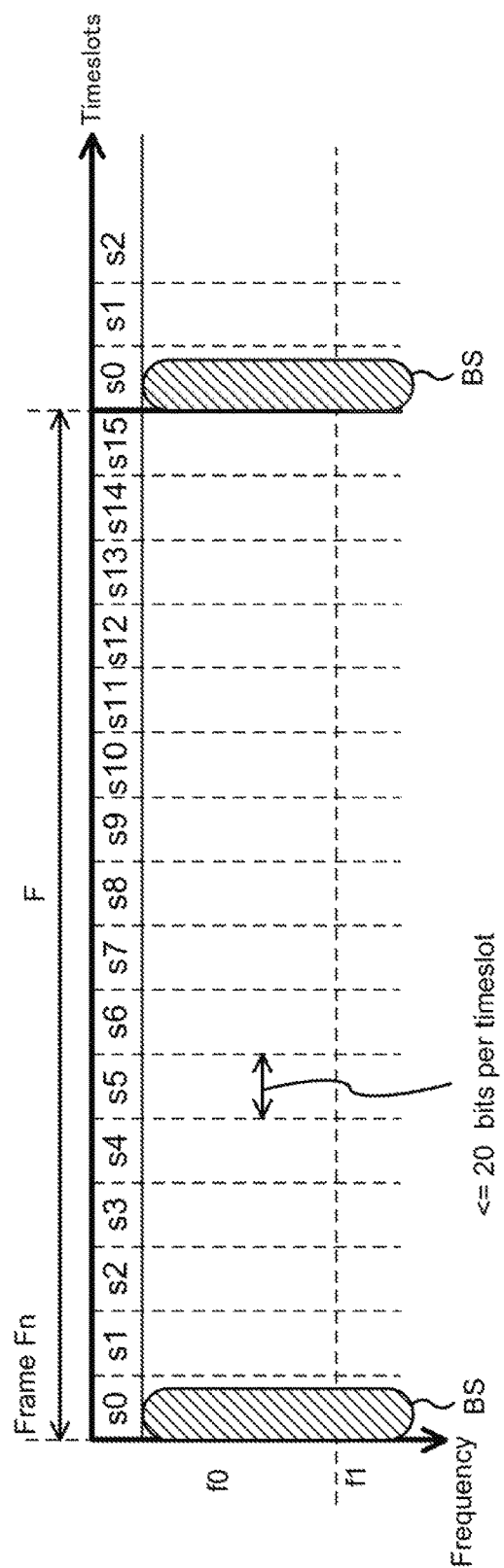
FIG. 3 is a sample frame format for use in bidirectional communication between a stylus and a sensor controller, wherein the frame is divided into sixteen (16) time slots s0~s15.

FIG. 3 is a sample frame format for use in bidirectional communication between an active stylus 100 and a sensor controller 200, wherein the bidirectional communication resource is divided into frames along a time axis and is divided into different frequencies along a frequency axis. Each frame is further divided into sixteen (16) time slots s0~s15 along the time axis, wherein each time slot is sized to accommodate up to 20 bits (16 information bits plus 4 CRC bits) for example. In one example, a frame length is 16 msec and a time slot length is 1 msec. It should be noted that a frame may be divided into less or more than 16 time slots, and the invention is not limited to the 16-time slot example illustrated herein. For example, a 16-msec frame may be divided into 64 time slots, wherein each time slot is 250 μsec long.

In exemplary embodiments, one or more time slots at the beginning of each frame are used in "uplink" by the sensor controller 200 to send periodic beacon signals (BS) to the active stylus 100. Thus, a frame may be considered as an interval between the beginnings of two successive beacon signals. Other time slots in each frame are used in "downlink" by the active stylus 100 to send signals (e.g., response signals to the beacon signals), data packets and position packets to the sensor controller 200, as illustrated in various examples of FIGS. 8A-9G to be described below. Though not illustrated, a gap time slot may be provided between the uplink time slot (s0 in FIG. 3) and the downlink time slots (s1-s15 in FIG. 3), during which no transmission is scheduled, uplink or downlink, to avoid collision between uplink transmission and downlink transmission.

Beacon signal is a periodic signal sent by the sensor controller 200 to allow nearby active styluses to discover the sensor controller 200 and to serve as timing reference for time slots used in bidirectional communication between the sensor controller 200 and the active styluses 100. Thus, in a typical embodiment, beacon signals are transmitted at all frequencies to be detectable by all active styluses. Each active stylus 100 listens for beacon signals and, after it detects a beacon signal, it sets its timing reference based on the beacon signal. Beacon signals subsequent to the initial beacon signal detected by the active stylus 100 to discover the sensor controller 200 may include various information, such as Hash#2 used to verify that the active stylus 100 was previously paired with the sensor controller 200, and commands to control operation of the active stylus 100 during and after the pairing operation. A beacon signal including Hash#2 or commands directed to the active stylus 100 typically includes a stylus ID of the active stylus 100 such that the active stylus 100 can identify which beacon signals are directed to the active stylus 100 (as opposed to other active styluses, if any). Beacon signals from the sensor controller 200 also typically include a sensor controller ID of the sensor controller 200.

In accordance with various embodiments, the sensor controller 200 quickly ascertains capability information of each active stylus 100 that is entering the sensing zone of the sensor controller 200 and determines, based on the ascertained capability information, a downlink time slot allocation for the active stylus 100. The active stylus 100 then starts bidirectional communication with the sensor controller, by transmitting data packets and/or position packets to the sensor controller according to the determined downlink time slot allocation that is supportive of the capability of the active stylus 100. For example, when the sensor controller 200 determines that a given active stylus has stylus orientation detection capability, the sensor controller 200 assigns downlink time slots for the active stylus 100 to transmit stylus orientation data to the sensor controller 200, while the sensor controller 200 does not assign such downlink time slots to an active stylus that does not have stylus orientation detection capability. Thus, the sensor controller 200 may assign a different downlink time slot allocation to an active stylus depending on the capability information of the active stylus. Because setting information regarding user-adjustable setting of the active stylus (e.g., stylus line width) may be modified while the active stylus is outside the sensing zone of the sensor controller 200, the sensor controller needs to ascertain the current setting information each time the active stylus reenters the sensing zone even when the active stylus has been previously paired with the sensor controller.

FIG. 4A is a table listing sample types of stylus capability information of an active stylus, including capability information and setting information. Capability information relates to predefined capability of the active stylus that is preconfigured, typically by a stylus vendor (manufacturer), and is typically not user-changeable. For example, the number of barrel switches provided on a stylus is not user-changeable. Capability information may also include a version number (4 bits) indicative of which version of the bidirectional communication protocol the active stylus complies with. Capability information may still further include "preferred color" (8 bits to indicate one of 140 CSS (Cascading Style Sheet) colors), which is a preferred or default color of the active stylus to be displayed on a screen of the sensor 201. Capability information may also relate to various other capabilities that may be configured for the active stylus by a vendor, as will be more fully described below in reference to FIG. 4B.

FIG. 4A also describes some setting information regarding user-adjustable setting of the active stylus, such as a "pen style" including a stylus line width and a stylus tip type (e.g., 0=pen, 1=eraser, 2=chisel tip marker, 3=airbrush, 4=pencil, and 5-7=reserved for custom/vendor-specific tip styles) and functions assigned to the tail/barrel buttons (switches) 111A/111B of the active stylus. For example, a user may change the pen style by operating the buttons (switches), or change the functions assigned to the buttons (switches). Setting information may relate to other user-changeable setting that may be configured for the active stylus. A unique identifying number of the active stylus may be changeable by a user through one or more switches located on the active stylus. For example, a vendor ID (8 bits) and a serial number (56 bits), which together form a 64-bit global ID for each stylus, can be user-changeable. (In some embodiments, a global ID is not user-changeable.) Also, the "preferred color" of the active stylus, which is described above as one type of capability information, may instead be user-adjustable setting information and a user may freely adjust the preferred (default) color using the buttons (switches) for example. As the example of "preferred color" indicates, difference between capability information and setting information is not rigid, and may change from vendor to vendor, or from stylus to stylus. Also, there may be some setting information that may be set by a user only once, or very infrequently, such that it may be treated as capability information.

FIG. 4B is a table listing a sample data format for use by an active stylus to transmit its capability information to the sensor controller 200. Capability information includes, for example, information regarding how many different levels (e.g., 256, 512, 1024, etc.) the pen tip pressure can be detected; the number of barrel buttons (e.g., 111A/111B) provided on the active stylus; the stylus's capability to detect barrel pressure (no or yes, and if yes, how many different levels the barrel pressure can be detected); and the stylus's capability to detect stylus orientation (e.g., stylus twist and tilt) as will be more fully described below in reference to FIG. 4C.

Capability information of FIG. 4B may further include information regarding whether a custom (customized) data size is set for a data packet (no or yes) and, if yes, the number of custom data bytes; the orientation resolution in which the stylus's orientation can be detected (e.g., 0 indicates 8 bit resolution, 1 indicates 9 bit resolution, and 2 indicates 10 bit resolution); the customized number (as opposed to default numbers) of different levels at which the pen tip pressure can be detected; the customized number (as opposed to default numbers) of barrel buttons provided on the active stylus; and the customized number of data bytes used to transmit orientation data (as opposed to default data bytes).

FIG. 4C is a table listing sample orientation codes for use by an active stylus to transmit capability information regarding the stylus's orientation detection capability to the sensor controller. An orientation code of 0 indicates the active stylus has no orientation detection capability; 1 indicates the active stylus can detect tilt in both X-direction and Y-direction and the detected X- and Y-tilt data can be transmitted in 2 time slots per frame; 2 indicates the active stylus can detect and transmit X- and Y-tilt plus twist (rotation) data in 3 time slots per frame; 3 indicates the active stylus can detect and transmit altitude and azimuth data of the active stylus relative to the sensor surface in 2 time slots per frame; 4 indicates the active stylus can detect and transmit altitude and azimuth data as well as twist (rotation) data in 3 time slots per frame; 5 indicates the active stylus includes a 6-axis IMU (inertial measurement unit) consisting of a combination of 3-axis gyroscope and 3-axis accelerometer and can transmit 6-axis IMU data in 3 time slots per frame; 6 indicates the active stylus includes a 9-axis IMU consisting of a combination of 3-axis gyroscope, 3-axis accelerometers and 3-axis magnetometer, and can transmit 9-axis IMU data in 3 time slots per frame, and 7 indicates a customized form of orientation data that can be detected and transmitted by the active stylus.

While the orientation code table of FIG. 4C shows different values 0 to 7 for different types of orientation sensors, an alternative approach is to provide a bit field of capabilities, as shown in FIG. 4D, which the active stylus can use to notify its orientation capability to the sensor controller. Each of the bits that are set in the capability information indicates that the stylus is capable of measuring that item. If the Barrel pressure bit is set in the capability information field, it indicates the stylus has a barrel pressure indication. If the Tilt bit is set it indicates the stylus is capable of measuring X and Y tilt. If the Twist bit is set it indicates the stylus is capable of measuring stylus axial twist. If the Altitude & Azimuth bit is set it indicates the stylus is capable of measuring altitude and azimuth of the stylus. If the IMUhasAccel bit is set it indicates the stylus has a three-axis accelerometer. If the IMUhasGyro flag is set it indicates the stylus has a three-axis gyroscope. If the IMUhasMagnet bit is set it indicates the stylus has a three-axis magnetometer. Each of these bits that are set indicates the need to allocate a time slot for that data, although as will be described below, for an IMU it is possible to multiplex data into a single time slot or a set of time slots.

FIG. 4E describes three examples of capability information of an active stylus. Example 1 is the capability information of a first active stylus, which can detect stylus tip pressure at 1024 different levels, has 1 barrel button, has no tangential (barrel) pressure sensing capability, no stylus orientation sensing capability and no custom capability. Example 2 is the capability information of a second active stylus, which can detect stylus tip pressure at 2048 different levels, has 2 barrel buttons, has tangential (barrel) pressure sensing capability, has stylus orientation sensing capability based on a 9-axis IMU (Orientation Code 6 in FIG. 4C), and has no custom capability. Example 3 is the capability information of a third active stylus, which can detect stylus tip pressure at a customized number of different levels wherein each pressure level (value) is expressed in 16 bits, has no barrel buttons and no tangential (barrel) pressure sensing capability, and has stylus orientation sensing capability to detect and report altitude and azimuth data as well as twist (rotation) data of the active stylus (Orientation Code 4 in FIG. 4C).

FIG. 5A is a table listing sample operational data indicative of the operational state of an active stylus, which may be transmitted from the active stylus to the sensor controller according to a schedule set by a downlink time slot allocation for the active stylus. In various embodiments, operational data transmitted according to a schedule are operational data the sensor controller needs to achieve proper interactive operation between the sensor controller and the active stylus. Such operational data include, for example, tip pressure data, tangential (barrel) pressure data, status of each barrel button (e.g., on/off state of each barrel button), invert data indicative of whether the active stylus is inverted from its intended orientation (i.e., the stylus tip is pointed upwardly, meaning that the stylus tail is pointing to and is in contact with the sensor surface to be used as an "eraser," for example), stylus orientation data, and any other customized operational data indicative of some operational state of the active stylus.

In some cases the amount of operational data from sensors in the stylus may be large. This is especially true of IMUs. These sensors may have any or all of the following: accelerometers with one to three axis, gyroscopes with one to three axis, and magnetometers with one to three axes. This could result in the need to send up to nine axes of data. As an alternative to sending this data in nine time slots of a dedicated type (e.g., X, Y, Z axes of the accelerometer; X, Y, Z axes of the gyroscope; and X, Y, Z axes of the magnetometer), the data can be multiplexed into one or more time slots.

To accomplish the multiplexing, the IMU data is tagged with a flag (IMU flag) to indicate which sensor (accelerometer, gyroscope, or magnetometer) the data came from. FIG. 5B, is an example of a data packet (or a report) for transmitting IMU data. In FIG. 5B, the "IMU data" field includes the IMU data itself, and the "IMU Flag" field indicates which sensor produced the IMU data. For example, if the IMU Flag is zero it could indicate that the data came from an accelerometer, if the IMU Flag is one it could indicate that the data came from a gyroscope, and if the IMU Flag is two it could indicate the data came from a magnetometer. The IMU data field may include X, Y, Z axes data produced by the sensor indicated by the IMU Flag.

For example, the nine axes of data (e.g., X, Y, Z axes of the accelerometer; X, Y, Z axes of the gyroscope; and X, Y, Z axes of the magnetometer) can be multiplexed into three time slots (or three data fields) of a common report format (or data packet), to form three reports at three different times, as below:

(report 1)
Sensor tag—"Accelerometer"
X axis data field—Accelerometer X axis data
Y axis data field—Accelerometer Y axis data
Z axis data field—Accelerometer Z axis data
(report 2)
Sensor tag—"Gyroscope"
X axis data field—Gyroscope X axis data
Y axis data field—Gyroscope Y axis data
Z axis data field—Gyroscope Z axis data
(report 3)
Sensor tag—"Magnetometer"
X axis data field—Magnetometer X axis data
Y axis data field—Magnetometer Y axis data
Z axis data field—Magnetometer Z axis data As another example, the nine axes of data can be multiplexed into one time slot (or one data field) of a common report format, to form nine reports at nine different times:

(report 1)
Sensor tag—"Accelerometer"
Axis tag—"X"
Data field—Accelerometer X axis data
(report 2)
Sensor tag—"Accelerometer"
Axis tag—"Y"
Data field—Accelerometer Y axis data
(report 3)
Sensor tag—"Accelerometer"
Axis tag—"Z"
Data field—Accelerometer Z axis data
(report 4)
Sensor tag—"Gyroscope"
Axis tag—"X"
Data field—Gyroscope X axis data
(report 5)
Sensor tag—"Gyroscope"
Axis tag—"Y"
Data field—Gyroscope Y axis data
(report 6)
Sensor tag—"Gyroscope"
Axis tag—"Z"
Data field—Gyroscope Z axis data
(report 7)
Sensor tag—"Magnetometer"
Axis tag—"X"
Data field—Magnetometer X axis data
(report 8)
Sensor tag—"Magnetometer"
Axis tag—"Y"
Data field—Magnetometer Y axis data (report 9)
Sensor tag—"Magnetometer"
Axis tag—"Z"
Data field—Magnetometer Z axis data Multiplexing the IMU data into one or more time slots (one or more data fields) in this manner has the advantage of reducing the number of required time slots in each report, at the expense of increasing the number of reports needed to transmit the IMU data, slowing down the overall IMU data rate.

In some embodiments the data from multiple IMU sensors may be combined in a process known as "sensor fusion" to produce desired position and motion information. For example, when it is desired to determine which direction of the active stylus is "down," the gyroscope data that indicates the direction of movement may be subtracted from the accelerometer data that indicates both the acceleration direction of movement and the acceleration direction of gravity. The result of the subtraction indicates the acceleration direction due to gravity alone, i.e., the "down" frame of reference.

Figure 9G:
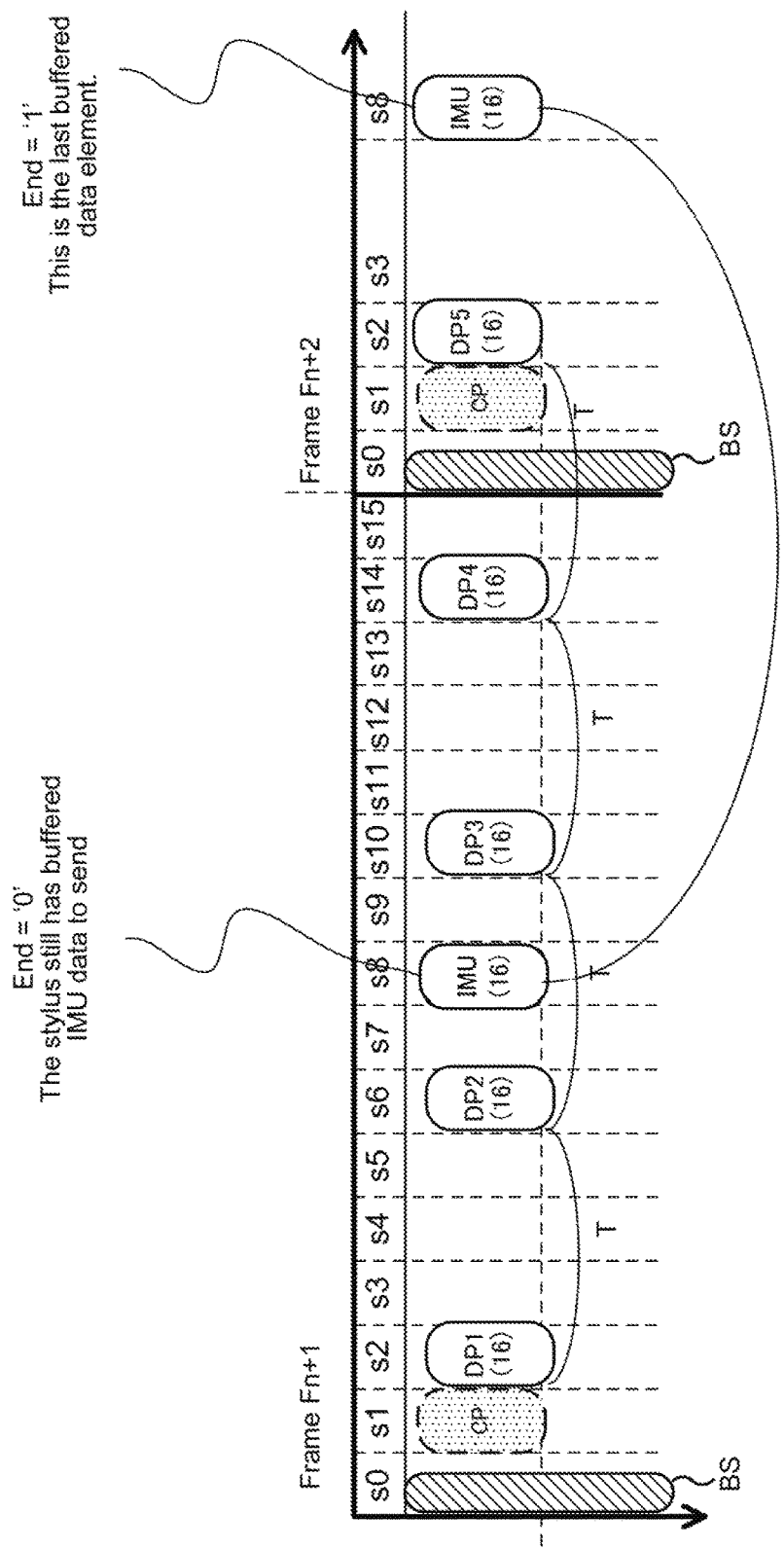

In performing "sensor fusion," the data from various IMU sensors should be measured as close in time as possible relative to each other to give the most accurate results. The "End" bit shown in FIG. 5B may be used to achieve synchronization among the data from various IMU sensors as follows. A measurement of the multiple IMU sensors is taken and buffered in the active stylus. This buffered data is sent in the available IMU time slot allocations with the End bit clear (e.g., "0"). FIG. 9G shows an example of IMU data packet and a usage of 'End bit.' When the last buffered data element is placed in a time slot the End bit is set (e.g., to "1") to indicate it is the last in the set of IMU data obtained by the multiple IMU sensors simultaneously or close in time. In the sensor controller, any IMU data received with the End bit clear is added to a buffer. When the sensor controller receives IMU data with the End bit set, the sensor controller may then use the data in the buffer as a complete set of IMU data from the multiple IMU sensors, for transfer to the host processor to perform sensor fusion.

FIG. 5C is a table listing sample operational data indicative of operational state of an active stylus, which the active stylus transmits to the sensor controller when polled (requested) by the sensor controller, such as a battery level of the active stylus. Thus, this type of operational data is only infrequently transmitted to the sensor controller.

It should be noted that the stylus capability information described above in reference to FIGS. 4A-4E and the operational data described above in reference to FIGS. 5A-5C are examples only, and the present invention is not limited to using the particular examples disclosed in FIGS. 4A-5C.

Figure 6:
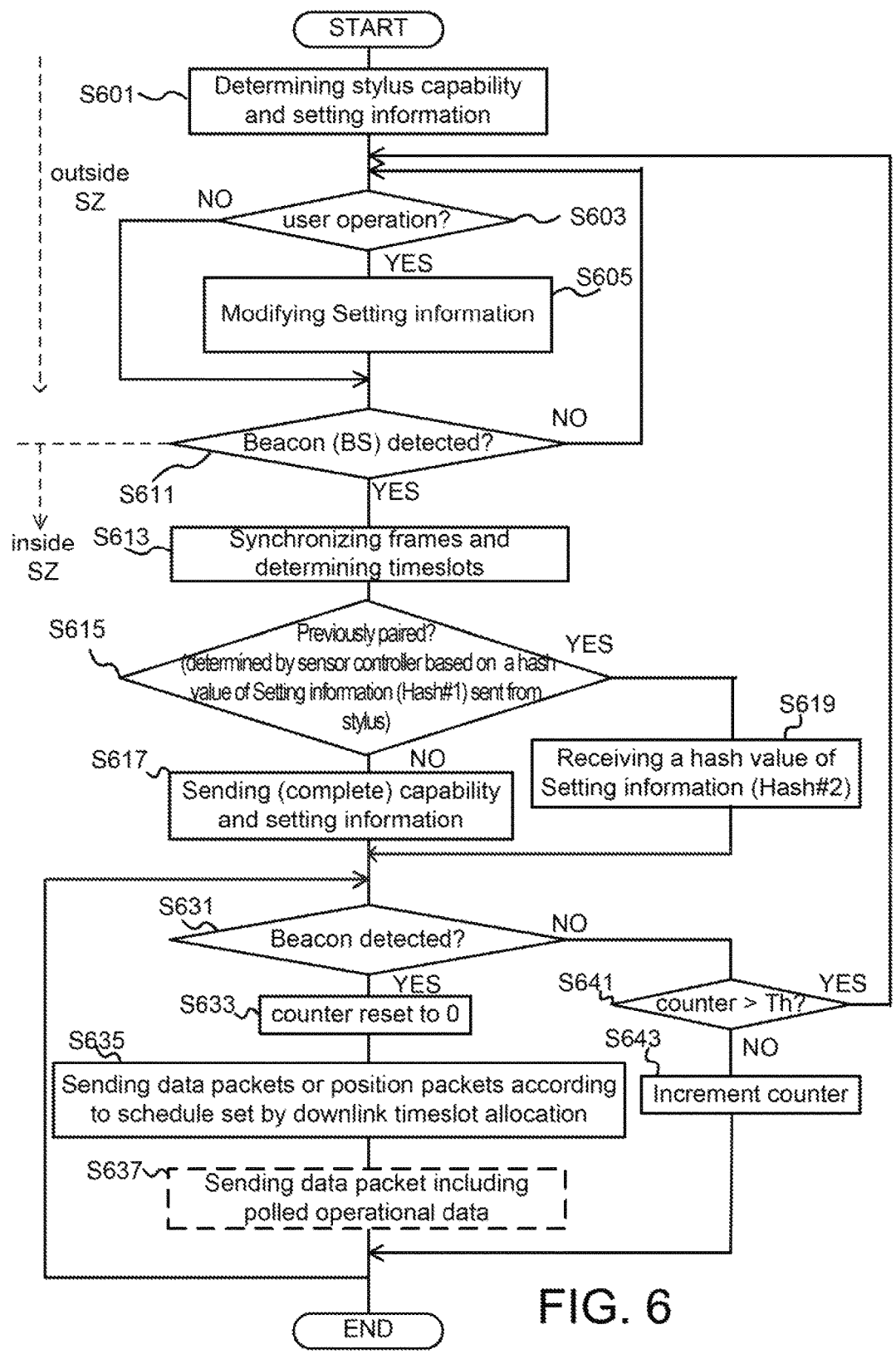
FIG. 6 is a flowchart illustrating a sample process flow of an active stylus.

FIG. 6 is a flowchart illustrating a sample process flow of an active stylus. In step S601, the active stylus determines its own stylus capability information, as stored in the table TBL of the stylus capability information manager 110 (FIG. 1) for example. When, in step S603, the active stylus detects user operation to modify the setting of the active stylus (e.g., stylus line width, color, etc.), in step S605 the active stylus updates the setting information accordingly. As shown in FIG. 6, steps S601-S605 typically occur while the active stylus 100 is outside the sensing zone of the sensor controller 200. In step S611, the active stylus listens for beacon signals from the sensor controller 200 and, if no beacon signal is detected, returns to step S603 and continues updating the setting information, as needed, and listening for beacon signals.

In step S611, upon entering the sensing zone of the sensor controller 200, the active stylus detects a beacon signal from the sensor controller 200. In step S613, the active stylus synchronizes its frame/time slots configuration with that of the sensor controller using the detected beacon signal as timing reference. In step S615, the active stylus sends a hashed value of the setting information (Hash#1) using a single downlink time slot to let the sensor controller determine whether the sensor controller recognizes the active stylus as the one the sensor controller has been previously paired with. If the sensor controller does not recognize the active stylus based on Hash#1, in step S617, in response to a capability information request (read) command received from the sensor controller, the active stylus sends its (complete) stylus capability information to the sensor controller, possibly using multiple downlink time slots. On the other hand, if the sensor controller recognizes the active stylus based on Hash#1, in step S619, the sensor controller sends a hashed value of the setting information ("Hash#2") to the active stylus for verification, preferably using a single uplink time slot. Pairing and "fast inking" operation between the active stylus and the sensor controller using Hash#1 and Hash#2 will be described further in reference to FIGS. 7 and 10 below.

After sending non-hashed stylus capability information in step S617, or receiving Hash#2 of the setting information in step S619, in step S631 the active stylus again listens for beacon signals from the sensor controller 200. The beacon signal detected at this time includes a downlink time slot allocation, which the sensor controller has determined for the active stylus based on the stylus capability information of the active stylus. When the beacon signal including the downlink time slot allocation is detected, in step S633 the active stylus resets a counter to 0, and in step S635 starts to transmit packets to the sensor controller according to a schedule set by the downlink time slot allocation included in the detected beacon signal. The packets to be transmitted may be position packets to be used by the sensor controller to determine a position of the active stylus and/or data packets that include operational data (e.g., sensed pressure data, sensed orientation data, etc.) of the active stylus. Also, when polled (requested) by the sensor controller in the beacon signal detected in step S631 or in any subsequently detected beacon signal (not shown in FIG. 6), in step S637 the active stylus transmits a data packet including the polled operational data, such as a battery level of the active stylus, to the sensor controller according to the downlink time slot allocation. For example, the active stylus may use any time slot, which is not used to transmit the scheduled packets in step S635 above, to transmit the data packet including the polled operational data.

After transmitting the non-hashed stylus capability information in step S617 or receiving Hash#2 of the setting information in step S619, if the active stylus does not detect a beacon signal in return in step S631, in step S641 the active stylus determines whether the counter has exceeded a threshold value and, if not, increments the counter value in step S643. If the counter exceeds the threshold value in step S641, it is assumed that the active stylus has exited the sensing zone of the sensor controller 200 (i.e., the user has moved the active stylus away from the sensor 201) and is beyond the reach of beacon signals from the sensor controller. Thus, the active stylus returns to steps S603, S605 and S611, to resume updating the setting information, as needed, and listening for (initial) beacon signals.

Figure 7:
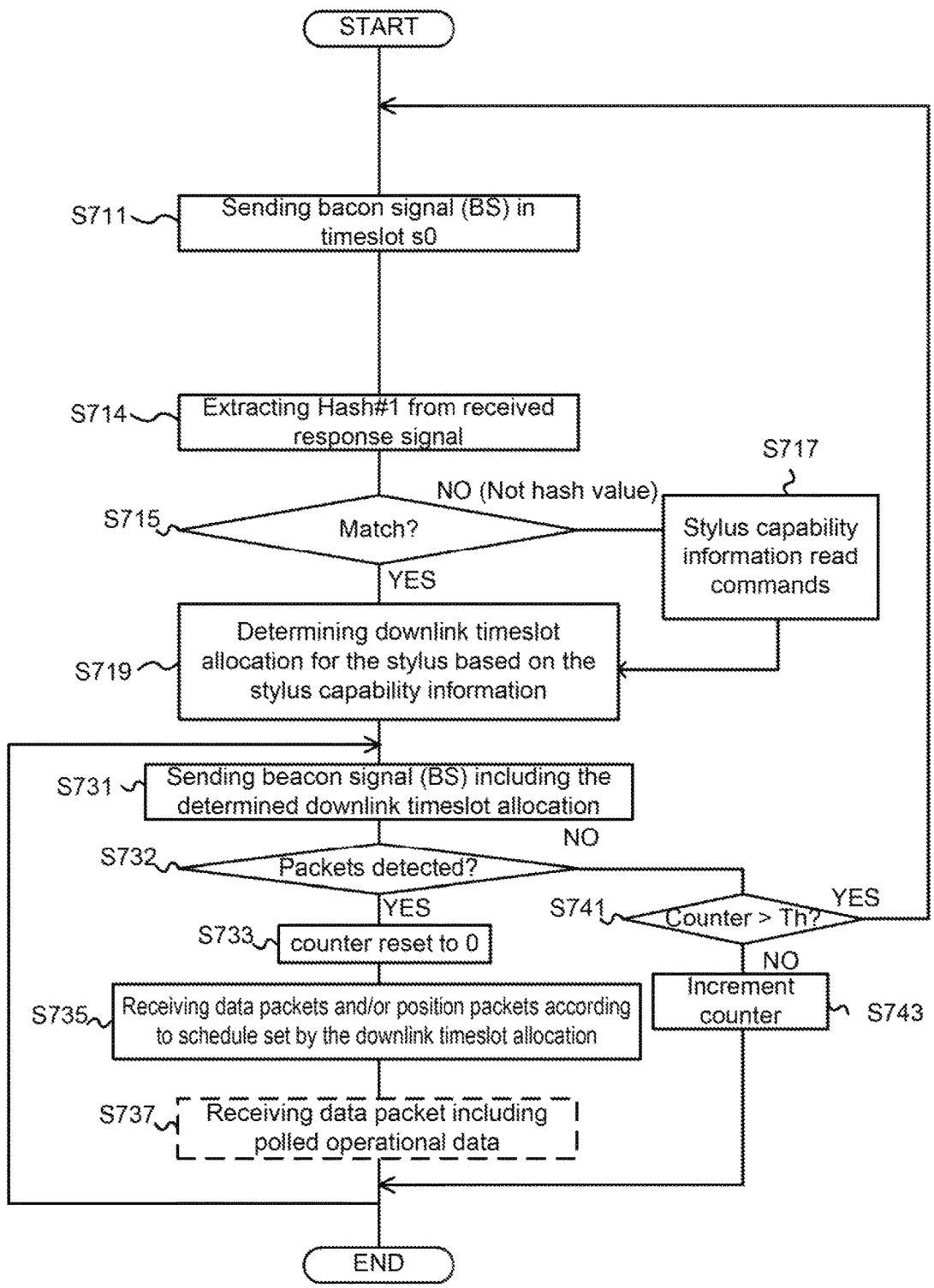
FIG. 7 is a flowchart illustrating a sample flow of a sensor controller, in particular, of performing pairing operation with an active stylus, in which the sensor controller receives a hash value indicative of the stylus capability information (e.g., setting information) from the active stylus and determines whether it recognizes the received hashed value and, if so, speeds up the pairing operation.

FIG. 7 is a flowchart illustrating a sample process flow of a sensor controller. FIG. 7 also illustrates a sample pairing operation between the sensor controller and an active stylus, in which the sensor controller receives from the active stylus a hash value ("Hash#1") indicative of the stylus capability information (e.g., setting information). If the sensor controller recognizes the received Hash#1, it may speed up the pairing operation.

In step S711, the sensor controller sends a beacon signal in the beginning time slot(s) of each frame, such as in the first time slot "s0." In step S714, the sensor controller extracts a hashed value (Hash#1) of the stylus capability information from a response (e.g., ACK) signal returned from an active stylus, which has detected the beacon signal. Hash#1 may be the hashed value of the stylus capability information in complete form including both the capability information and the setting information, or may be of the setting information.

In step S715, the sensor controller determines whether the extracted Hash#1 corresponds to the hashed value (Hash#1) of the stylus capability information (e.g., setting information) cached in the sensor controller. Essentially, step S715 is a step in which the sensor controller determines whether it recognizes the active stylus as the one that the sensor controller has been previously paired with; if so the sensor controller already has complete stylus capability information of the active stylus.

If the sensor controller does not recognize Hash#1 in step S715, in step S717, the sensor controller sends a beacon signal including a read command to request the active stylus to transmit its stylus capability information. Alternatively or additionally the sensor controller may send a beacon signal including a write command to forcibly configure (set) a certain setting for the active stylus. For example, the sensor controller may issue a write command to set a certain default color for the active stylus.

In step S719, the sensor controller confirms that it has the stylus capability information of the active stylus, which the sensor controller has received in complete form using multiple downlink time slots (see step S617 in FIG. 6) or has confirmed as already cached in the sensor controller based on Hash#1. The sensor controller then determines a downlink time slot allocation for the active stylus based on the stylus capability information. The downlink time slot allocation specifies which downlink time slots in a frame are allocated to the active stylus and may also specify what types of packets (e.g., data packets or position packets) the active stylus should transmit in what downlink time slots. The sensor controller determines a downlink time slot allocation for each active stylus based on the particular capability information of the active stylus. For example, to an active stylus including stylus orientation and barrel pressure sensors in addition to a stylus tip pressure sensor, the sensor controller may allocate more downlink time slots to transmit operational data indicative of outputs from these various sensors, as compared to an active stylus that includes only a stylus tip pressure sensor. When multiple active styluses of various capabilities and settings are used with the sensor controller, the sensor controller determines a downlink time slot allocation for each active stylus while avoiding downlink time slot collision among the multiple active styluses. That is, in some embodiments, each time slot is allotted to one active stylus and is not shared by multiple styluses. In other embodiments, the sensor controller assigns a specific frequency to each active stylus as part of the downlink time slot allocation for the active stylus. Then, the same time slot may be assigned to multiple active styluses which are assigned multiple frequencies, respectively. Various examples of downlink time slot allocation will be described below in reference to FIGS. 8A-9G.

Referring back to FIG. 7, in step S731, the sensor controller sends a beacon signal including the determined downlink time slot allocation back to the active stylus that has sent the ACK signal. Then, in step S732 the sensor controller listens for packets to be transmitted from the active stylus according to the downlink time slot allocation. If the sensor controller detects packets from the active stylus, in step S733 the sensor controller resets a counter to 0, and in step S735 the sensor controller continues to receive packets (position packets and/or data packets including operational data) according to a schedule set by the downlink time slot allocation. Also, when the sensor controller polls the active stylus, in any of the beacon signals, to report certain operational data such as a battery level of the active stylus, in step S737 the sensor controller receives a data packet including the polled operational data from the active stylus.

After transmitting the beacon signal including the downlink time slot allocation in step S731, if the sensor controller does not detect any packets returned in the allocated downlink time slots in step S732, in step S741 the sensor controller determines whether the counter has exceeded a threshold value and, if not, increments the counter value in step S743. If the counter exceeds the threshold value in step S741, it is assumed that the active stylus has exited the sensing zone of the sensor controller 200 (i.e., the user has moved the active stylus away from the sensor 201) and is beyond the reach of beacon signals from the sensor controller. Thus, the sensor controller returns to steps S711 and S713 and continues to transmit periodic beacon signals and wait for a response signal from an active stylus.

FIGS. 8A and 8B illustrate sample frame formats, in which a sensor controller transmits a beacon signal (BS) to an active stylus, and the active stylus transmits a response signal including stylus capability information (CP or Hash#1) back to the sensor controller. In FIG. 8A, in time slot s0 of the first frame Fn, the sensor controller sends a beacon signal, and in the next time slot s1, an active stylus that has detected the beacon signal returns a response signal including non-hashed stylus capability information of the active stylus ("CP 1"). In this example, the active stylus has not been previously paired with and thus does not recognize the sensor controller (NO in step S615 of FIG. 6). Thus, the active stylus sends complete (non-hashed) stylus capability information in time slot s1, perhaps over multiple frames depending on the size of the complete stylus capability information. FIG. 8A shows that the active stylus transmits the non-hashed stylus capability information in time slot s1 of at least two frames, Fn and Fn+1, as CP1 and CP2.

In FIG. 8B, the active stylus has been previously paired with and thus recognizes the sensor controller (YES in step S615 of FIG. 6). Thus, the active stylus sends a hashed value of its setting information ("Hash#1") in a response signal transmitted in time slot s1. Advantageously the hash value of the setting information is of fixed data size, which is typically 20 bits or less and can be transmitted in a single time slot. Therefore, unlike the example of FIG. 8A described above, Hash#1 representative of the setting information of the active stylus can be rapidly transmitted to the sensor controller using time slot s1 of a single frame (Fn).

The sensor controller, upon receiving and recognizing Hash#1 (YES in step S715 of FIG. 7), realizes that it already has the stylus capability information of the active stylus and, hence, the downlink time slot allocation for the active stylus. Thus, in time slot s0 of the next frame Fn+1, the sensor controller sends a beacon signal, which includes the downlink time slot allocation to be used by the active stylus to transmit packets to the sensor controller.

The sensor controller may notify the active stylus of the downlink time slot allocation in various ways. For example, upon recognizing Hash#1 transmitted from the active stylus, the sensor controller may send Hash#2 which corresponds to Hash#1 back to the active stylus. When the active stylus confirms that Hash#2 transmitted from the sensor controller corresponds to Hash#2 stored in the active stylus (wherein Hash#2 and Hash#1 are calculated based on the same setting information), the active stylus determines that it can use the same downlink time slot allocation that it used when it was previously paired with the sensor controller. Thus, in this example, the sensor controller transmits the downlink time slot allocation to the active stylus by transmitting Hash#2 in a beacon signal in response to receipt of Hash#1. In another example, the sensor controller may transmit a predefined code indicative of a particular downlink time slot allocation to the active stylus, wherein the sensor controller and the active stylus share a list of predefined codes and what downlink time slot allocation each code indicates. In this example, the sensor controller transmits the downlink time slot allocation to the active stylus by transmitting one of the predefined codes in a beacon signal. As yet another example, the sensor controller may transmit the downlink time slot allocation by transmitting, for example, an offset value and an interval value that specify the positions of downlink time slots allocated to the active stylus per frame, as will be more fully described below in reference to FIGS. 9A-9G. In this example, the sensor controller transmits the downlink time slot allocation to the active stylus by transmitting an offset value and an interval value, for example, in a beacon signal.

In FIG. 8B, the beacon signal in time slot s0 of frame Fn+1 includes the downlink time slot allocation determined for the active stylus. Thus, the active stylus reads the beacon signal to determine the downlink time slot allocation, and starts transmitting data packets (DP), which include the stylus's operational data, in time slot s2 of frame Fn+1 according to the determined downlink time slot allocation.

FIGS. 9A-9G illustrate seven different frame formats, in which an active stylus transmits packets to the sensor controller according to seven different kinds of downlink time slot allocation specified by the sensor controller, respectively. In each of FIGS. 9A-9G, the beacon signal in time slot s0 of frame Fn+1 includes the downlink time slot allocation determined for the active stylus, and thus the active stylus can transmit packets (data packets and/or position packets) to the sensor controller starting at time slot s1 of frame Fn+1 according to the determined downlink time slot allocation.

In FIG. 9A, the downlink time slot allocation specifies that the active stylus is to transmit data packets including operational data (e.g., 14 bits) starting at time slot s2 of frame Fn+1 at equal intervals (T) of four (4) time slots, i.e., in time slots s6, s10 and s14 in frame Fn+1 and in time slots s2, s6, s10 and s14 in frame Fn+2, and so forth. In this case, the sensor controller may define the downlink time slot allocation by specifying: i) an offset value indicative of a starting time slot for use by the active stylus to transmit packets, and ii) an interval value indicative of intervals between time slots allocated to the active stylus beginning with the starting time slot. For example, the downlink time slot allocation of the example of FIG. 9A may be specified by an offset of "2" indicating that the starting time slot is s2, and an interval value of "4" indicating that subsequent time slots at equal intervals (T) of 4 time slots are to be used by the active stylus. The sensor controller may encode these values (offset: 2, interval: 4) in a beacon signal to thereby transmit the downlink time slot allocation to the active stylus. The downlink time slot allocation may additionally specify, for example, a total number of packets to be transmitted (e.g., "5" (DP1~DP5) in the example of FIG. 9A) and/or a data format of the packets (e.g., how many total bits per packet, of which how many bits indicate pen pressure data and how many bits indicate barrel pressure data, etc.).

FIG. 9A also illustrates that time slot s1 of each frame Fn+1, Fn+2, and so forth, is reserved as a downlink time slot for the active stylus to optionally send its stylus capability information (CP) to the sensor controller. For example, when the user adjusts the setting of the active stylus (e.g., the user changes the stylus line width) during a bidirectional communication session with the sensor controller, the active stylus may send the adjusted setting information to the sensor controller in time slot s1 of a subsequent frame. Additionally or alternatively, when the beacon signal from the sensor controller includes a read command requesting stylus capability information of the active stylus, in response the active stylus includes the requested capability and/or setting information in time slot s1 of a subsequent frame.

FIG. 9A further illustrates that time slot s15 of frame Fn+1 is reserved as a downlink time slot for the active stylus to send a data packet including operational data that is polled (requested) in a preceding beacon signal from the sensor controller. For example, when the beacon signal in time slot s0 of frame Fn+1 requests the active stylus to report its battery level, in response the active stylus sends a data packet including the polled operational data ("Poll DP") in time slot s15 of frame Fn+1.

In FIG. 9B, the downlink time slot allocation specifies that the active stylus is to transmit data packets including operational data (e.g., 14 bits) starting with time slot s3 of frame Fn+1 at equal intervals (T) of four (4) time slots, i.e., in time slots s7, s11 and s15 in frame Fn+1 and in time slots s3, s7, s11 and s15 in frame Fn+2, and so forth. Similarly to the example of FIG. 9A described above, the downlink time slot allocation of the example of FIG. 9B may be specified by an offset of "3" indicating that the starting time slot is s3, and an interval value of "4" indicating that subsequent time slots to be used are at equal intervals (T) of 4 time slots. FIG. 9B also illustrates that time slot s1 of each frame Fn+1, Fn+2, and so forth, is reserved as a downlink time slot for the active stylus to optionally send stylus capability information (CP) to the sensor controller. Furthermore, when the beacon signal in time slot s0 of frame Fn+1 polls (requests) the active stylus to report certain operational data of the active stylus, such as the stylus's battery level, in response the active stylus sends a data packet including the polled operational data ("Poll DP") in time slot s1 of frame Fn+1.

In various embodiments, one or more time slots (e.g., s1) after the beacon signal time slot (s0) in each frame is reserved for the active stylus to send a response signal (e.g., an ACK signal) to acknowledge receipt of the beacon signal in the preceding time slot (s0). Thus, a "response signal" as used herein is not limited to the first response signal that the active stylus transmits upon entering the sensing zone of the sensor controller in response to the initial (discovery) beacon signal. Instead, response signals may include subsequent response signals, which the active stylus transmits in response to subsequent beacon signals including various commands or other information directed to the active stylus. For example, the active stylus may transmit a response signal responsive to a subsequent beacon signal including a new downlink time slot allocation, which has been updated by the sensor controller during the bidirectional communication session due to changed setting of the active stylus. As another example, when a subsequent beacon signal includes a read command requesting the active stylus to transmit stylus capability information, the active stylus sends a response signal including the requested stylus capability information (see FIG. 9A, wherein "CP" sent in time slot s1 of frames Fn+1 and Fn+2 may be considered a response signal including the requested stylus capability information). As a further example, when a subsequent beacon signal includes a polling command requesting the active stylus to transmit certain operational data (e.g., stylus battery level) of the active stylus, the active stylus sends a response signal including the polled operational data (see FIG. 9B, wherein "Poll DP" sent in time slot s1 of frame Fn+1 may be considered a response signal including the polled operational data).

In FIG. 9C, the downlink time slot allocation specifies that the active stylus is to transmit relatively large data packets (e.g., more than 14 bits) starting at time slot s2 of frame Fn+1, in a unit of two (2) time slots, at equal intervals (T) of four (4) time slots, i.e., in time slots [s2/s3], [s6/s7], [s10/s11] and [s14/s15] in frame Fn+1, frame Fn+2, and so forth. The downlink time slot allocation of the example of FIG. 9C may be specified by an offset of "2" indicating that the starting time slot is s2, an interval value of "4" indicating that subsequent time slots to be used are at equal intervals (T) of 4 time slots, and additionally by a unit size value of "2" indicating that a unit of 2 time slots is used to form each of the data packets (DP1, DP2, DP3, DP4, DP5, etc.). The unit size value of "2" may be considered as a packet length to be used by the active stylus. Such relatively large data packets may be needed, for example, to transmit customized operational data (CD) of the active stylus to the sensor controller.

As in FIGS. 9A and 9B, FIG. 9C also illustrates that time slot s1 of each frame Fn+1, Fn+2, and so forth, is reserved as a downlink time slot for the active stylus to optionally send stylus capability information (CP) to the sensor controller. FIG. 9C further illustrates that, when the beacon signal in time slot s0 of frame Fn+1 polls (requests) the active stylus to report certain operational data (e.g., stylus battery level), in response the active stylus sends a data packet including the polled operational data ("Poll DP") in time slot s1 of frame Fn+1.

FIG. 9D illustrates a combination of a first downlink time slot allocation that assigns frequency f0 to a first active stylus, and a second downlink time slot allocation that assigns frequency f1 different from frequency f0 to a second active stylus different from the first active stylus.

The first downlink time slot allocation specifies that the first active stylus, operating at frequency f0, is to transmit relatively large data packets (e.g., a data packet including stylus orientation data (OR) that occupies two time slots per frame: see ORC 1 or 3 in FIG. 4C) starting at time slot s2 of frame Fn+1, in a unit of three (3) time slots, at equal intervals (T) of eight (8) time slots, i.e., in time slots [s2/s3/s4] and [s10/s11/s12] in frame Fn+1, frame Fn+2, and so forth. The first downlink time slot allocation may be specified by an offset of "2" indicating that the starting time slot is s2, an interval value of "8" indicating that subsequent time slots to be used are at equal intervals (T) of 8 time slots, and a unit size value (or packet length) of "3" indicating that a unit of 3 time slots is used to form each of the data packets (DP1, DP2, DP3, etc.).

The second downlink time slot allocation specifies that the second active stylus, operating at frequency f1, is also to transmit relatively large data packets (e.g., a data packet including stylus orientation data (OR) that occupies three time slots per frame: see ORC 2 or 4 in FIG. 4C) starting at time slot s2 of frame Fn+1, in a unit of four (4) time slots, at equal intervals (T) of eight (8) time slots, i.e., in time slots [s2/s3/s4/s5] and [s10/s11/s12/s13] in frame Fn+1, frame Fn+2, and so forth. The second downlink time slot allocation may be specified by an offset of "2" indicating that the starting time slot is s2, an interval value of "8" indicating that subsequent time slots to be used are at equal intervals (T) of 8 time slots, and a unit size value (or packet length) of "4" indicating that a unit of 4 time slots is used to form each of the data packets (DP1, DP2, DP3, etc.).

In FIG. 9D, as in previous examples, time slot s1 of each frame Fn+1, Fn+2, and so forth, is reserved as a downlink time slot for both of the first active stylus operating at frequency f0 and the second active stylus operating at frequency f1 to optionally send stylus capability information (CP) to the sensor controller. FIG. 9D further illustrates that, when the beacon signal in time slot s0 of frame Fn+1 polls (requests) either of the first or second active stylus to report certain operational data (e.g., stylus battery level), in response the polled active stylus sends a data packet including the polled operational data ("Poll DP") in time slot s15 of frame Fn+1. In the example of FIG. 9D, the beacon signal in time slot s0 of frame Fn+1 polled the first active stylus operating at frequency f0 and, thus, the first active stylus responds by transmitting a data packet including the polled operational data ("Poll DP") in time slot s15 of frame Fn+1.

Once the sensor controller assigns a particular frequency (e.g., f0, f1) to each of multiple active styluses, the sensor controller may include a command directed to a particular active stylus only in a frequency portion of the beacon signal assigned to that active stylus.

In FIG. 9E, which is similar to FIG. 9A, the downlink time slot allocation specifies that the active stylus is to transmit data packets including operational data (16 bits) starting at time slot s2 of frame Fn+1 at equal intervals (T) of four (4) time slots, i.e., in time slots s6, s10 and s14 in frame Fn+1 and in time slots s2, s6, s10 and s14 in frame Fn+2, and so forth. The downlink time slot allocation of this example may be specified by an offset of "2" indicating that the starting time slot is s2, and an interval value of "4" indicating that subsequent time slots to be used are at equal intervals (T) of 4 time slots. FIG. 9E also illustrates that time slot s1 of each frame Fn+1, Fn+2, and so forth, is reserved as a downlink time slot for the active stylus to optionally send stylus capability information (CP) to the sensor controller. FIG. 9E further illustrates that, when the beacon signal in time slot s0 of frame Fn+1 polls (requests) the active stylus to report certain operational data (e.g., stylus battery level), in response the active stylus sends a data packet including the polled operational data ("Poll DP") in time slot s15 of frame Fn+1.

The downlink time slot allocation examples of FIGS. 9A-9E all specify downlink transmission of data packets (DP1, DP2, DP3, DP4, DP5, etc.) which include operational data of the active stylus. On the other hand, the downlink time slot allocation of FIG. 9F specifies not only which downlink time slots to use in a frame but also what types of packets (data packets (DP) or position packets (XY)) the active stylus should transmit in which downlink time slots.

Specifically, the downlink time slot allocation of FIG. 9F specifies that the active stylus is to transmit position packets (XY), which are to be used by the sensor controller to determine a position pointed to by the active stylus on the sensor 201, starting at time slot s2 of frame Fn+1 at equal intervals (T) of four (4) time slots, i.e., in time slots s2, s6, s10 and s14 of each frame. The downlink time slot allocation further specifies that each position packet (XY) is immediately followed by a data packet (DP1, DP2, DP3, DP4, DP5, etc.) transmitted in time slots s3, s7, s11 and s15 of each frame. Thus, a unit of two time slots [s2/s3], [s6/s7], [s10/s11] and [s14/s15] is used to transmit a position packet (XY) and a data packet (DP). The downlink time slot allocation of the example of FIG. 9F may be specified by an offset of "2" indicating that the starting time slot is s2, an interval value of "4" indicating that subsequent time slots to be used are at equal intervals (T) of 4 time slots, a unit size value of "2" indicating that a unit of 2 time slots is used to transmit a position packet (XY) and a data packet (DP) in succession, and a packet type value indicative of what type of packet is transmitted in each unit. For example, a packet type value 0 may indicate only data packets are transmitted in each unit (DP/DP), 1 may indicate only position packets are transmitted in each unit (XY/XY), 2 may indicate that a position packet immediately followed by a data packet are transmitted in each unit (XY/DP) as in the example of FIG. 9F, and 3 may indicate that a data packet immediately followed by a position packet are transmitted in each unit (DP/XY).

As in the previous examples of downlink time slot allocation, FIG. 9F also illustrates that time slot s1 of each frame Fn+1, Fn+2, and so forth, is reserved as a downlink time slot for the active stylus to optionally send stylus capability information (CP) to the sensor controller.

It should be noted that the downlink time slot allocation of FIGS. 8A-9G are examples only, and the present invention is not limited to using the particular examples of FIGS. 8A-9G.

Operating systems and applications running on the system (host) controller 300 side often use smoothing on the data provided by the sensor controller 200. This includes smoothing on coordinate data produced by the sensor controller 200 as well as stylus data such as pressure or tilt. In many cases the algorithms of the applications assume the data is measured at equally spaced time intervals when applying the smoothing. There may be situations where the sensor controller 200 is unable to provide time slot allocations that provide equally spaced position packets or equally spaced data packets. In these cases the sensor controller 200 may have to sub-sample, super-sample, interpolate, extrapolate, or by some means adjust the data such that the data appears at equally spaced time intervals.

This technique also applies when coordinates and/or operational data is measured at different rates due to the time slot allocations. Data packets from the sensor controller 200 to the host processor 300 have no way to indicate missing data, so missing data needs to be generated as above (e.g., by sub-sampling, super-sampling, interpolation, extrapolation, etc.) to fill these intermediate packets with valid data. For example, if orientation data is available at half the rate of coordinate data, the orientation data needs to be super-sampled or extrapolated to twice the data rate to match the coordinate data rate.

Figure 10:
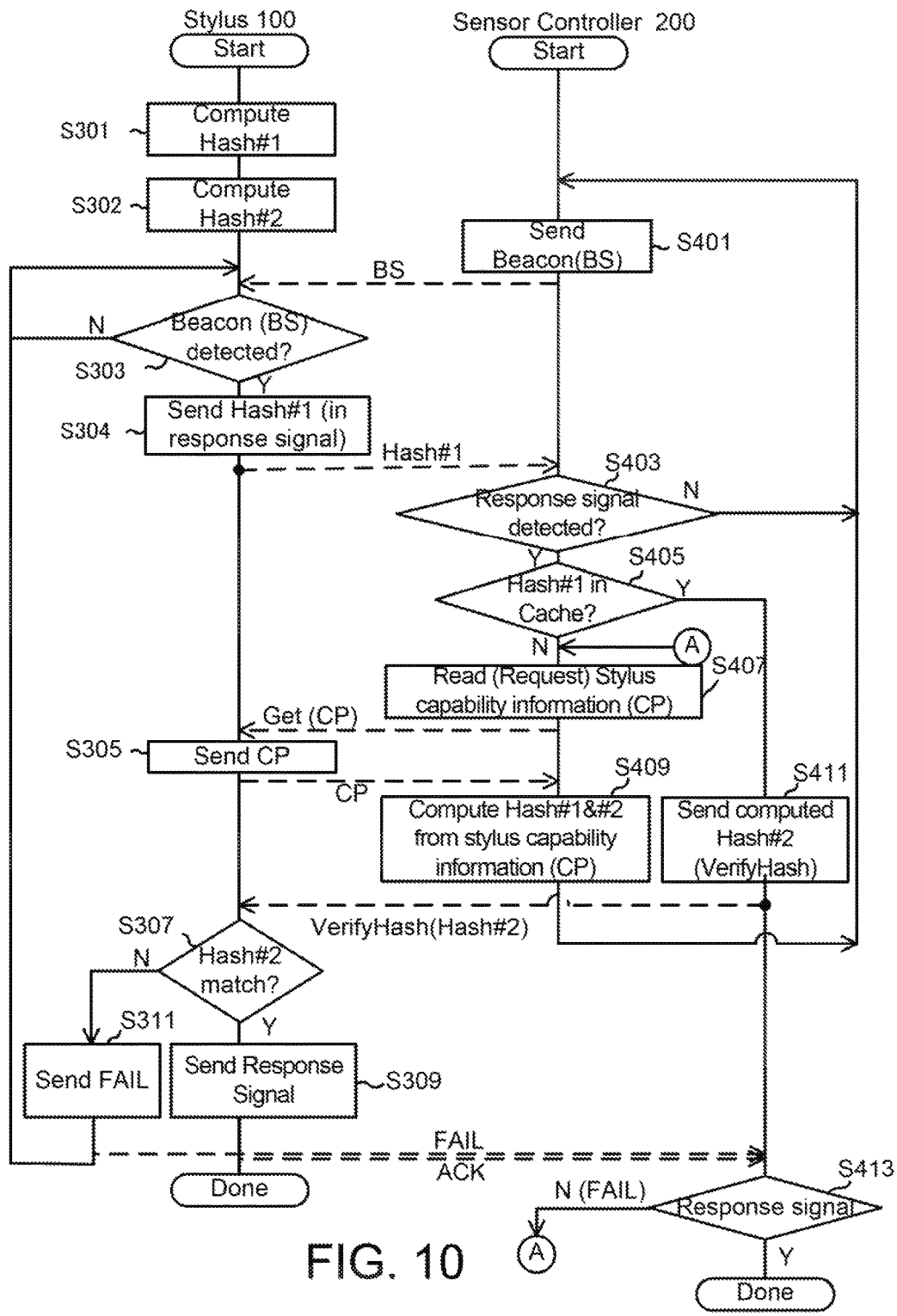
FIG. 10 is a flowchart illustrating a sample pairing operation between an active stylus and a sensor controller, in which the active stylus transmits a hash value indicative of its capability information, and the sensor controller determines whether it recognizes the received hashed value and, if so, speeds up the pairing operation. The sensor controller additionally uses a second hash value as further verification that the received capability information is from the previously-paired stylus.

FIG. 10 is a flowchart illustrating a sample pairing operation (and "fast inking" operation) between an active stylus and a sensor controller, in which the active stylus transmits a hash value ("Hash#1") indicative of its setting information to the sensor controller. The sensor controller, after recognizing the received Hash#1, returns a second hash value ("Hash#2") to the active stylus, as further verification that it has correctly recognized the active stylus as a previously-paired stylus.

If the sensor controller recognizes the received Hash#1 (meaning that the sensor controller has been previously paired with the active stylus), the sensor controller may speed up the pairing operation using the stylus capability information and/or the downlink time slot allocation of the active stylus already cached in the sensor controller.

In step S301, the active stylus applies a hashing operation to its setting information, for example, to calculate a hash value ("Hash#1") of a fixed size (e.g., 16 bits), which can be transmitted in a single time slot which typically accommodates up to 20 bits. In step S302, the active stylus calculates a second hash value ("Hash#2"), which corresponds to Hash#1 and thus can be used to verify Hash#1, as will be more fully described below. Hash#1 and Hash#2 may be calculated at power up and any time a change takes place that affects the hash value, such as when a user changes the setting (e.g., stylus line width) of the active stylus. Any suitable hashing operation may be used to calculate Hash#1 and Hash#2. For example, MurmurHash3™ algorithm, known in the art, may be used to calculate a 32-bit hash value based on capability information of any length. Then, the 16 LSBs of the hash value may be used as Hash#1 and the 16 MSBs of the hash value may be used as Hash#2. The calculated Hash#1 and Hash#2 are stored in the active stylus, for example in the table (TBL) of the stylus capability information manager 110 (see FIG. 1).

A hashing operation may be applied to some or all of the stylus capability information of the active stylus. For example, in order to reduce the possibility of hash collision in which the same hash value is calculated for two active styluses or for two different settings of one active stylus, it may be desirable to exclude capability information from the hash calculation because capability information may be common amongst multiple active styluses manufactured by the same vendor. Thus, in various exemplary embodiments, the active stylus calculates Hash#1 and Hash#2 based on the setting information portion of the stylus capability information of the active stylus and a global ID of the active stylus, to create a unique "Hash ID" of the active stylus that is unlikely to collide with a Hash ID of another active stylus or of the same active stylus having different setting. In some embodiments of the present invention, two hashing functions may be used to calculate Hash#1 and Hash#2, respectively, to further reduce the potential for hash collisions. For example, Hash#1 may be calculated using algorithm 1 on the stylus capability information, such as a variation of CRC (cyclic redundancy check) adjusted to produce a 13-bit hash value, and Hash#2 may be calculated using algorithm 2 on the stylus capability information, such as a variation of FNV (Fowler-Noll-Vo) adjusted to produce a 16-bit hash value.

In step S401, the sensor controller sends a beacon signal (BS). In step S303, when the active stylus detects the beacon signal, in step S304, the active stylus sends Hash#1 calculated in step S301 above to the sensor controller as part of a response signal.

In step S403, when the sensor controller detects the response signal from the active stylus, in step S405, the sensor controller determines if Hash#1 included in the response signal is already cached in the sensor controller. If not, in step S407, the sensor controller sends a read command in a subsequent beacon signal to request the active stylus to transmit its complete (non-hashed) stylus capability information (CP). In step S305, the active stylus, in response to the read command from the sensor controller, transmits the requested stylus capability information (CP) to the sensor controller. The sensor controller, in step S409, computes Hash#1 and Hash#2 based on the received stylus capability information (CP) and stores them in cache for future use. Alternatively, in step S409, the sensor controller calculates only Hash#2 and stores the calculated Hash#2 with Hash#1 that was received and evaluated in step S405 above. In step S409 the sensor controller uses the same hashing operation to calculate Hash#1 and Hash#2 as that used in steps S301 and S302 by the active stylus.

Returning to step S405, if the sensor controller determines that Hash#1 included in the response signal from the active stylus is already cached in the sensor controller, Hash#2 corresponding to Hash#1 is also cached in the sensor controller (see step S409). Thus, in step S411, the sensor controller sends Hash#2 corresponding to Hash#1 back to the active stylus for verification purposes. Specifically, in step S307, the active stylus determines whether Hash#2 returned from the sensor controller matches Hash#2 cached in the active stylus, which corresponds to Hash#1 that the active stylus has sent in step S304 above. If yes, the active stylus confirms that the sensor controller has correctly recognized the active stylus as the one that the sensor controller has been previously paired with. Then, in step S309, the active stylus sends a response signal to the sensor controller to verify that the sensor controller already has the stylus capability information (including the setting information) and/or the downlink time slot allocation of the active stylus. In step S413, the sensor controller receives the response signal from the active stylus and concludes the verification process. At this point, both of the active stylus and the sensor controller are ready to start bidirectional communication using the same downlink time slot allocation they used when they were previously paired. Also at this time, the sensor controller may immediately start "inking" operation because it has all the setting information (e.g., brush style, line width, line color, etc.) of the active stylus that an application program needs to start drawing lines formed by the active stylus.

If, in step S307, the active stylus determines that Hash#2 received from the sensor controller does not correspond to Hash#2 stored in the active stylus, in step S311 the active stylus sends a failure message (FAIL) to the sensor controller to indicate verification failure, and returns to step S303 to resume listening for beacon signals from the sensor controller.

In step S413, the sensor controller is notified of verification failure either by receiving the failure message (FAIL) sent from the active stylus (step S311) or by not receiving the response signal indicative of successful verification from the active stylus (step S309). When verification fails, the sensor controller returns to step S407 to request the active stylus to transmit its complete (non-hashed) stylus capability information (CP).

The various embodiments described above can be combined to provide further embodiments, and aspects of the embodiments can be modified based on the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of managing a pairing state between an active stylus and a sensor controller, the sensor controller coupled to a sensor configured to receive input from the active stylus, the method comprising:
the active stylus, in response to detecting a first uplink signal from the sensor controller, transmitting a downlink response signal including first data (Hash#1) to the sensor controller;
the sensor controller, in response to determining that the first data (Hash#1) included in the downlink response signal matches data cached in the sensor controller, maintaining a paired state between the active stylus and the sensor controller and transmitting a second uplink signal including second data (Hash#2) to the active stylus, wherein the second data (Hash#2) corresponds to the first data (Hash#1) and wherein the first data (Hash#1) and the second data (Hash#2) are derived from defined information provided by the active stylus; and
the active stylus, in response to determining that the second data (Hash#2) included in the second uplink signal does not match data stored in the active stylus, returning to an unpaired state from the paired state.

2. The method of claim 1, wherein the first data (Hash#1) is stored in association with the active stylus in the sensor controller.

3. The method of claim 1, wherein the first data (Hash#1) is derived from applying a first algorithm to the defined information provided by the active stylus, and the second data (Hash#2) is derived from applying a second algorithm to the defined information provided by the active stylus.

4. The method of claim 3, wherein the first data (Hash#1) is part of data derived from applying the first algorithm to the defined information provided by the active stylus, and the second data (Hash#2) is part of data derived from applying the second algorithm to the defined information provided by the active stylus.

5. The method of claim 3, wherein the defined information provided by the active stylus is one or both of capability information regarding predefined capability of the active stylus and setting information regarding user-adjustable setting of the active stylus, the capability information including a stylus ID or part of the stylus ID, and the setting information including at least one of a stylus color value, a stylus line width value, and a stylus tip type value.

6. The method of claim 5, wherein the first data (Hash#1) and the second data (Hash#2) are varied depending on the setting information of the active stylus.

7. The method of claim 6, wherein the active stylus includes a user-operable switch, and the setting information includes a switch value indicative of a status of the switch.

8. The method of claim 1, comprising:
the sensor controller, in response to determining that the first data (Hash#1) included in the downlink response signal does not match data cached in the sensor controller, requesting the active stylus to transmit the defined information to the sensor controller.

9. The method of claim 1, comprising:
the active stylus, in response to determining that the second data (Hash#2) included in the second uplink signal matches data stored in the active stylus, maintaining the paired state between the active stylus and the sensor controller and transmitting a second downlink response signal to the sensor controller.

10. The method of claim 1, wherein the active stylus determines whether the second data (Hash#2) included in the second uplink signal matches the second data (Hash#2) stored in the active stylus.

11. An active stylus, comprising:
a receiver which, in operation, receives a first uplink signal from a sensor controller coupled to a sensor configured to receive input from the active stylus;
a processor coupled to the receiver and which, in operation, detects the first uplink signal and prepares a downlink response signal including first data (Hash#1); and
a transmitter coupled to the processor and which, in operation, transmits the downlink response signal including the first data (Hash#1) to the sensor controller, wherein,
the receiver, in operation, receives from the sensor controller a second uplink signal including second data (Hash#2), wherein the second data (Hash#2) corresponds to the first data (Hash#1) and wherein the first data (Hash#1) and the second data (Hash#2) are derived from defined information provided by the active stylus, and
the processor, in operation, determines whether the second data (Hash#2) included in the second uplink signal matches the second data (Hash#2) stored in the active stylus and, if a match is found, maintains a paired state between the active stylus and the sensor controller and, if a match is not found, returns to an unpaired state from the paired state.

12. The active stylus of claim 11, wherein the first data (Hash#1) is derived from applying a first algorithm to the defined information provided by the active stylus, and the second data (Hash#2) is derived from applying a second algorithm to the defined information provided by the active stylus.

13. The active stylus of claim 12, wherein the first data (Hash#1) is part of data derived from applying the first algorithm to the defined information provided by the active stylus, and the second data (Hash#2) is part of data derived from applying the second algorithm to the defined information provided by the active stylus.

14. The active stylus of claim 12, wherein the defined information provided by the active stylus is one or both of capability information regarding predefined capability of the active stylus and setting information regarding user-adjustable setting of the active stylus, the capability information including a stylus ID or part of the stylus ID, and the setting information including at least one of a stylus color value, a stylus line width value, and a stylus tip type value.

15. The active stylus of claim 14, wherein the first data (Hash#1) and the second data (Hash#2) are varied depending on the setting information of the active stylus.

16. The active stylus of claim 15, which includes a user-operable switch, and the setting information includes a switch value indicative of a status of the switch.

17. The active stylus of claim 11, wherein,
the receiver, in operation, receives from the sensor controller a request for the defined information, and
the processor, in response to receiving the request, prepares the defined information to be transmitted, via the transmitter, to the sensor controller.

18. The active stylus of claim 11, wherein,
the processor, if the match is found, prepares a second downlink response signal, and
the transmitter transmits the second downlink response signal to the sensor controller.

* * * * *